United States Patent [19]
Umezawa

[11] Patent Number: 5,668,681
[45] Date of Patent: Sep. 16, 1997

[54] AUTOMATIC-REVERSE TAPE PLAYER WITH A SWITCHABLE ROTATIONAL GEAR ASSEMBLY

[75] Inventor: Koji Umezawa, Kanagawa, Japan

[73] Assignee: Sony Corporation, Tokyo, Japan

[21] Appl. No.: 492,911

[22] Filed: Jun. 20, 1995

[30] Foreign Application Priority Data

Jun. 27, 1994 [JP] Japan .................................. 6-145012

[51] Int. Cl.$^6$ .......................... G11B 15/44; G11B 15/18
[52] U.S. Cl. .......................................................... 360/96.4
[58] Field of Search ................................. 360/96.3–96.5

[56] References Cited

U.S. PATENT DOCUMENTS

| | | | |
|---|---|---|---|
| 5,006,941 | 4/1991 | Otsuki | 360/96.3 |
| 5,450,275 | 9/1995 | Kunze et al. | 360/96.3 |
| 5,481,427 | 1/1996 | Ishikawa et al. | 360/96.3 |

FOREIGN PATENT DOCUMENTS

| | | |
|---|---|---|
| 0432816 | 6/1991 | European Pat. Off. . |
| 0488714 | 6/1992 | European Pat. Off. . |
| 4230127 | 3/1994 | Germany . |

Primary Examiner—Stuart S. Levy
Assistant Examiner—George J. Letscher
Attorney, Agent, or Firm—Jay H. Maioli

[57] ABSTRACT

An automatic-reverse tape player has a pair of capstans, a pair of flywheels cooperating respectively with the capstans, a pair of reel bases, a single capstan motor rotatable only in one direction, a rotation transmitting mechanism for transmitting rotation from the single capstan motor to rotate the flywheels in respective directions different from each other, a stationary low-speed-feed rotation transmitting mechanism rotatable by one of the flywheels for transmitting rotation therefrom through a slip mechanism, a switchable rotational relay mechanism for transmitting rotation from the stationary low-speed-feed rotation transmitting mechanism selectively to one of the reel bases to feed a tape at a low speed, and a switching mechanism for displacing the switchable rotational relay mechanism away from the stationary low-speed-feed rotation transmitting mechanism into operative coupling with the other of the flywheels to allow the switchable rotational relay mechanism to transmit rotation from the other of the flywheels selectively to one of the reel bases to feed the tape at a high speed.

4 Claims, 20 Drawing Sheets

AUTOMATIC-REVERSE TAPE PLAYER WITH A SWITCHABLE ROTATIONAL GEAR ASSEMBLY

BACKGROUND OF THE INVENTION

The present invention relates to an automatic-reverse tape player, and more particularly to an operation switching mechanism for use in such an automatic-reverse tape player.

Automatic-reverse cassette tape players are widely used in automobiles. Many of these automatic-reverse cassette tape players have a common motor for rotating capstans and reel bases for the purpose of saving electric energy. In ordinary cassette tape players, the rotational speed of a reel base varies depending on the diameter of the tape being wound or unwound on the reel base in a play mode in which the tape is fed at a constant speed by a pair of capstans and a pair of pinch rollers. A slip mechanism is associated with the reel base for allowing the tape that is fed at the constant speed by the capstans and the pinch rollers to be wound on the reel base without being slackened or excessively tensioned.

The tape transport mechanism of an automatic-reverse cassette tape player has a pair of slip mechanisms associated with the respective reel bases for feeding the tape at a constant speed in opposite directions. When the tape is fed at the constant speed, rotational forces are transmitted from one of a pair of flywheels rotated in different directions by one capstan motor selectively to one of the slip mechanisms associated with the respective reel bases depending on the direction in which the tape is transported. A pair of intermediate rotatable idlers is disposed between the pair of flywheels and the pair of slip mechanisms. The pair of flywheels and the pair of intermediate rotatable idlers make the entire mechanism complex and result in an increased number of parts. Since the intermediate rotatable idlers are spaced from each other, delicate timing has been required to control the switching between the intermediate rotatable idlers in synchronism with the switching between the pinch rollers, and it is tedious and time-consuming to adjust such timing.

It is widely known to control the switching between the directions in which the tape is transported, the switching to a fast feed mode, and the loading and ejecting of the tape with a combination of a reversible control motor and cam gears. For example, there is known a switching mechanism for effecting the above switching operations with an intermediate cam gear swingable into mesh with one of the cam gears, each having tooth-free regions, depending on the direction in which the control motor rotates.

With the known structure, the cam gears are concentrically stacked one on the other, and hence are of a complex structure as a whole in their transverse direction. Furthermore, the cam gears do not have a large layout freedom as various members of the switching mechanism and the cam gears are coupled to each other in one position. It has been difficult to achieve delicate timing for controlling reciprocating movement of the loading and tape transport mechanisms while the cam gears are reciprocally rotating through about 360°.

SUMMARY OF THE INVENTION

It is an object of the present invention to provide an automatic-reverse tape player which is of a simple structure and is made up of a reduced number of parts.

Another object of the present invention is to provide an automatic-reverse tape player which has a tape transport mechanism that allows simple adjustment of timing for switching between tape feeding directions.

Still another object of the present invention is to provide an operation switching mechanism which is composed of parts that can be positioned with an improved layout freedom.

Yet still another object of the present invention is to provide an operation switching mechanism which makes it easy to achieve timing for controlling switching between a plurality of mechanisms.

According to the present invention, there is provided a reversible tape player comprising a pair of capstans, a pair of flywheels integral with the capstans, respectively, a pair of reel bases, a single capstan motor rotatable only in one direction, rotation transmitting means for transmitting rotation from the single capstan motor to rotate the flywheels in respective directions different from each other, a stationary low-speed-feed rotation transmitting mechanism rotatable by one of the flywheels for transmitting rotation therefrom through a slip mechanism, switchable rotational relay means for transmitting rotation from the stationary low-speed-feed rotation transmitting mechanism selectively to one of the reel bases to feed a tape at a low speed, and a switching mechanism for displacing the switchable rotational relay means away from the stationary low-speed-feed rotation transmitting mechanism into operative coupling with the other of the flywheels to allow the switchable rotational relay means to transmit rotation from the other of the flywheels selectively to one of the reel bases to feed the tape at a high speed.

The low-speed-feed rotation transmitting mechanism doubles as a slip mechanism which imparts a winding torque to the reel bases. Since rotation is transmitted to either one of the reel bases from the common rotation transmitting mechanism when the tape is to be fed at a constant speed in both normal and reverse directions, the overall arrangement is simple in structure and made up of a reduced number of parts. Timing for switching between pinch rollers may be adjusted between them and the common rotation transmitting mechanism. Therefore, the tape transport mechanism is capable of simplified adjustment of the switching timing.

According to the present invention, there is also provided an operation switching mechanism for a cassette tape player, comprising a control motor, a support member, a drive body supported on the support member and reversibly rotatable by the control motor, a rotatable body rotatably supported on the support member in rolling contact with the drive body for reciprocal angular movement about the drive body in response to rotation of the drive body, first and second intermediate rotatable members disposed one on each side of each the rotatable body in spaced-apart relation from each other, a first cam member reciprocally movable by the first intermediate rotatable member in response to rotation of the rotatable body upon rolling contact of the rotatable body with the first intermediate rotatable member due to angular movement of the rotatable body in one direction, a second cam member reciprocally movable by the second intermediate rotatable member in response to rotation of the rotatable body upon rolling contact of the rotatable body with the second intermediate rotatable member due to angular movement of the rotatable body in an opposite direction, a tape cassette loading mechanism reciprocally movable under the control of reciprocal movement of the first cam member, and a tape transport mechanism reciprocally movable under the control of reciprocal movement of the second cam member.

The first intermediate rotatable member for controlling the loading mechanism and the second intermediate rotatable member for controlling the tape transport mechanism are positioned in spaced-apart relation to each other, and the rotatable body which is reciprocally angularly moved rotates one of the first and second intermediate rotatable members in one direction or the other. Consequently, it is necessary to locate cam members in one position, however, they can be positioned with an improved layout freedom. The operation switching mechanism simplifies adjustment of timing control for a plurality of mechanisms.

DETAILED DESCRIPTION OF THE PREFERRED EMBODIMENT

Figure 1:
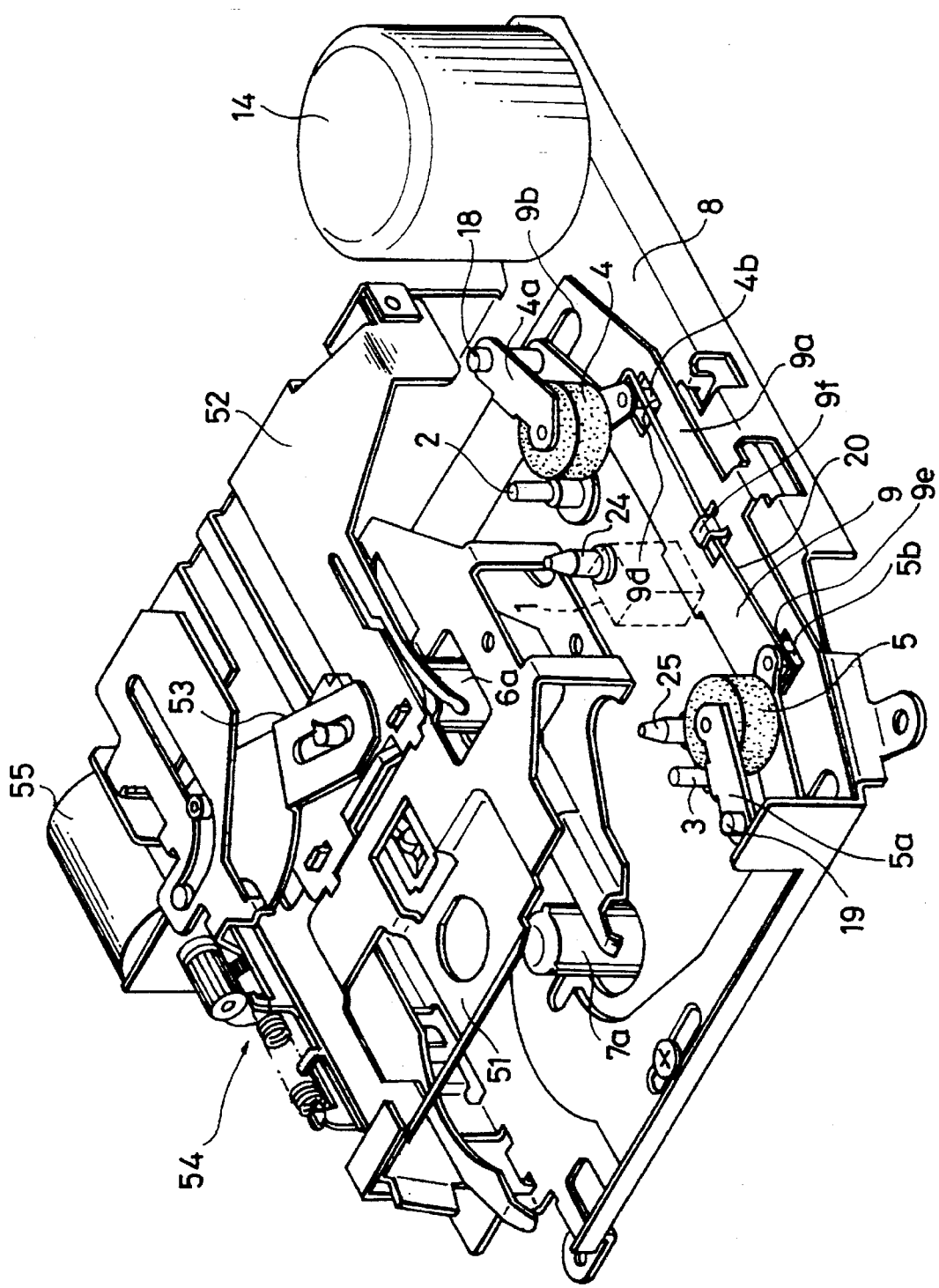
FIG. 1 is a perspective view of a tape transport for use in a tape player according to the present invention.
Figure 2:
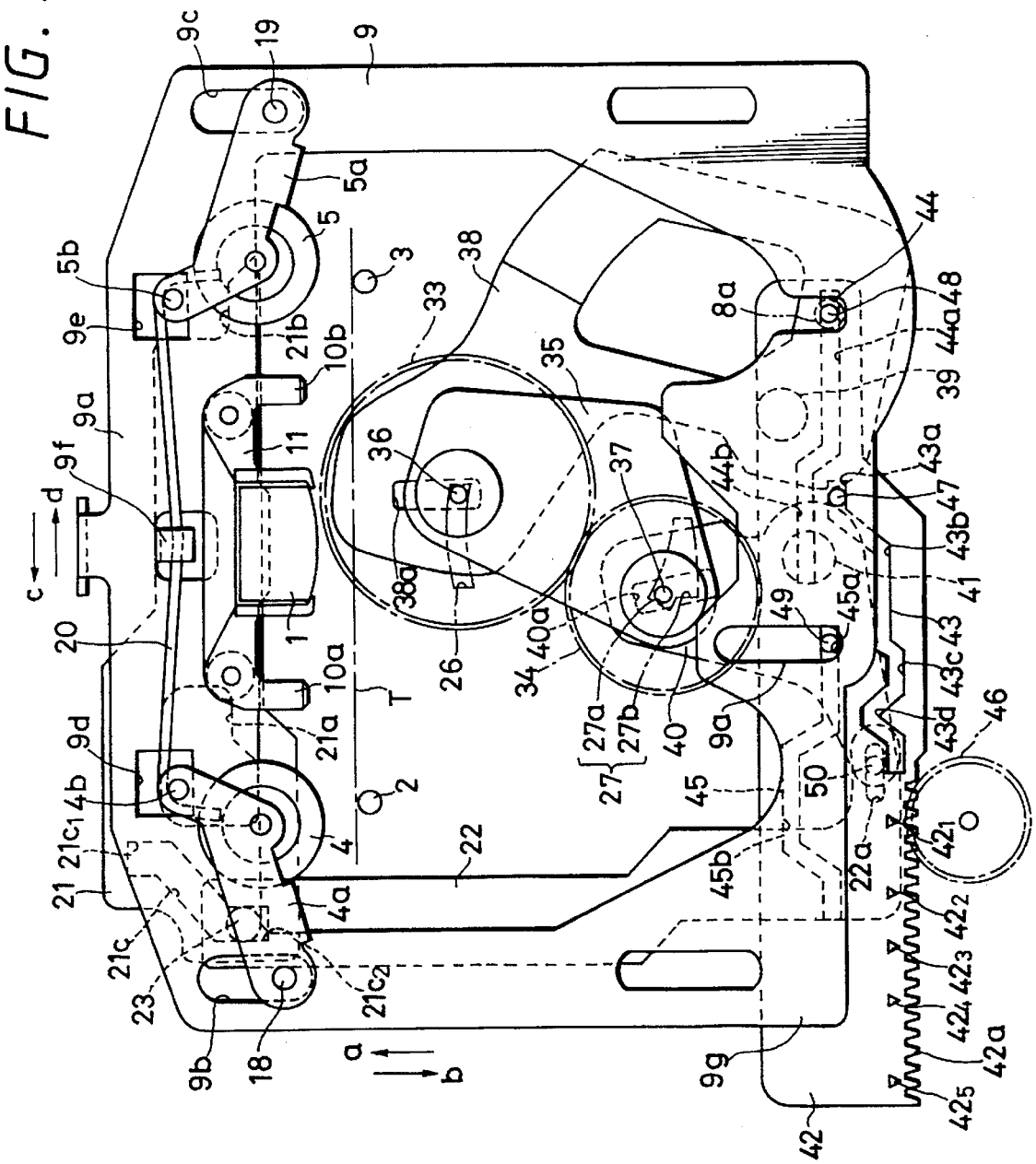
FIG. 2 is a plan view of a switching mechanism, showing eject and stop modes.
Figure 3:
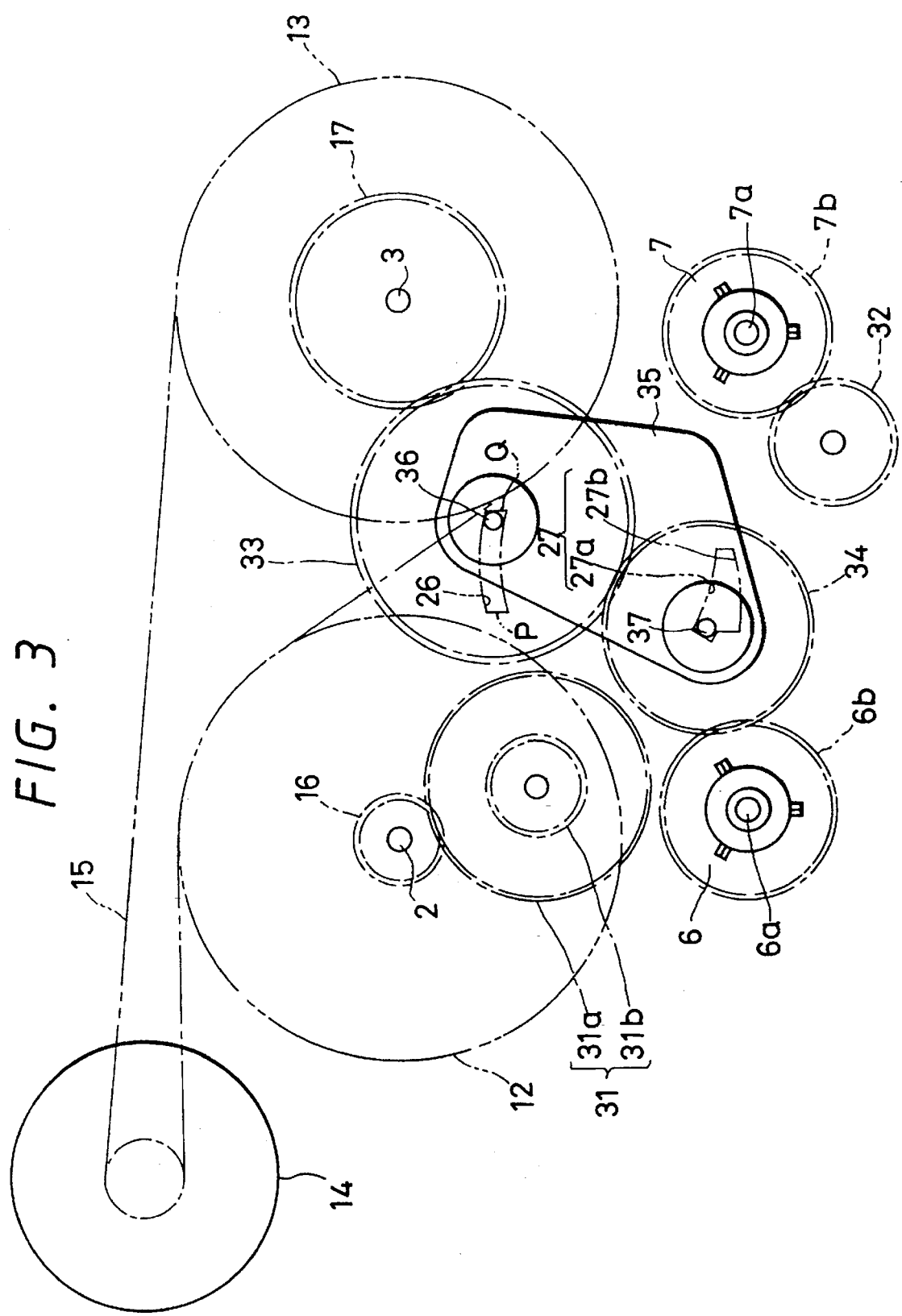
FIG. 3 is a plan view of a tape transport mechanism, showing normal fast-feed and reverse rewind modes.

As shown in FIGS. 1 through 3, a tape transport for use in a tape cassette player comprises a magnetic head 1, a pair of upwardly extending capstans 2, 3, a pair of pinch rollers 4, 5, and a pair of reel bases 6, 7 including respective central reel drive shafts 6a, 7a and respective gears 6b, 7b mounted respectively on and extending around the reel drive shafts 6a, 7a. The reel base 6 serves as a take-up reel base, and the reel base 7 serves as a supply reel base. The magnetic head 1 is mounted on a front side member 9a of a centrally open rectangular head base 9 by a support frame 11 having a pair of spaced tape guides 10a, 10b on its opposite sides. The rectangular head base 9 is slidable in a forward direction indicated by the arrow "a" in FIG. 2 and a backward direction indicated by the arrow "b" in FIG. 2.

The capstans 2, 3 are rotatably supported on a chassis 8. As shown in FIG. 3, a belt 15 for transmitting rotational forces from a capstan motor 14 is trained around flywheels 12, 13 which are coaxially mounted respectively on the capstans 2, 3. The capstan 2 serves as a take-up capstan, and the capstan 3 serves as a supply capstan. Gears 16, 17 are also coaxially mounted respectively on the take-up and supply capstans 2, 3. The gear 16 mounted on the take-up capstan 2 is of a smaller diameter and is fixed to the flywheel 12, whereas the gear 17 mounted on the supply capstan 3 is of a larger diameter and is attached to the flywheel 13 through a slip mechanism.

As shown in FIGS. 1 and 2, the pinch rollers 4, 5 are rotatably supported on respective pinch roller levers 4a, 5a. The pinch rollers 4, 5 are positioned in confronting relation to the take-up and supply capstans 2, 3, respectively. The pinch roller levers 4a, 5a are angularly movably supported at ends thereof on respective shafts 18, 19 which are vertically mounted on the chassis 8 and extend through respective slots 9b, 9c defined in respective opposite sides of the front side member 9a of the head base 9. The slots 9b, 9c are elongate in the forward and backward directions "a", "b". Stoppers 4b, 5b are mounted on respective free ends of the pinch roller levers 4a, 5a and extend downwardly into respective holes 9d, 9e that are defined in the front side member 9a of the head base 9 at spaced-apart positions. The stoppers 4b, 5b are engaged by respective opposite ends of a elongate spring 20 whose central region is engaged by a spring holder 9f raised from a central portion of the front side member 9a. The pinch roller levers 4a, 5a are normally biased to move in a direction toward the capstans 2, 3, respectively, by the spring 20.

As shown in FIG. 2, a pinch roller switching lever 21 is positioned underneath the front side member 9a of the head base 9 for sliding movement on the chassis 8 in lateral directions normal to the forward and backward directions "a", "b". The pinch roller switching lever 21 has engaging edges 21a, 21b for sliding engagement with the respective stoppers 4b, 5b on the pinch roller levers 4a, 5a for controlling switching operation of the pinch rollers 4, 5. The pinch roller switching lever 21 also has a cam groove 21c defined in one side thereof and extending in the forward and backward directions "a", "b". The cam groove 21c has front and rear ends $21c_2$, $21c_2$ that are staggered in the lateral directions. The front end $21c_1$ is positioned inwardly of the rear end $21c_2$ with respect to the geometric configuration of the tape transport.

The cam groove 21c receives a cam pin 23 mounted on a front end of an interlink lever 22 which is slidable on the chassis 8 in the forward and backward directions "a", "b". When the interlink lever 22 slides forward, the cam pin 23 in the cam groove 21 moves in the forward direction "a" until it engages the front end $21c_1$ of the cam groove 21. Therefore, the pinch roller switching lever 21 is shifted laterally outwardly in the direction indicated by the arrow "c" until the engaging edge 21a faces the stopper 4b on the pinch roller lever 4a. When the interlink lever 22 slides backward, the cam pin 23 in the cam groove 21 moves in the backward direction "b" until it engages the rear end $21c_2$ of the cam groove 21. Therefore, the pinch roller switching lever 21 is shifted laterally inwardly in the direction indicated by the arrow "d" until the engaging edge 21b faces the stopper 5b on the pinch roller lever 5a.

As shown in FIG. 1, upwardly extending guide posts 24, 25 for positioning a tape cassette are mounted on the chassis 8 in the vicinity of the capstans 2, 3, respectively.

Figure 5:
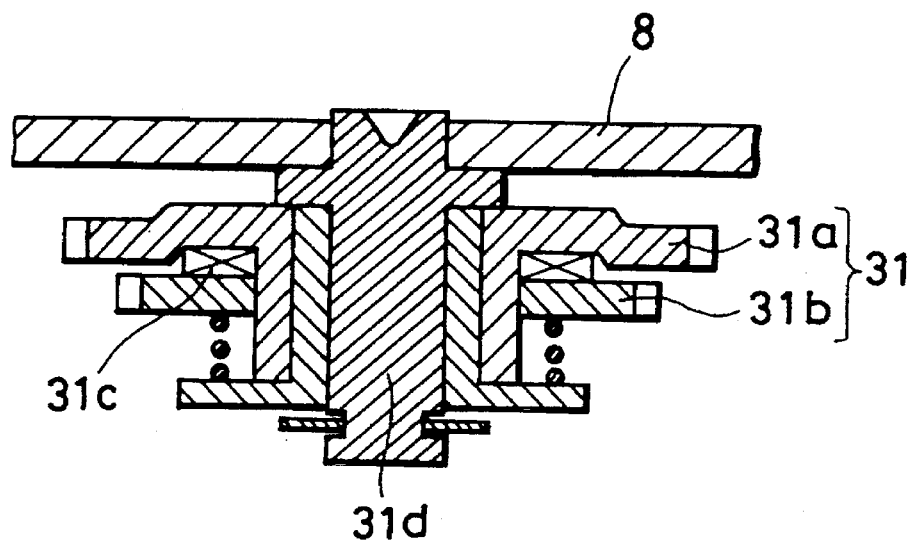
FIG. 5 is a vertical cross-sectional view of a gear assembly for a play mode in the tape transport mechanism shown in FIG. 3.

As shown in FIGS. 3 and 5, a gear assembly 31 for a play mode comprises a larger gear 31a, a smaller gear 31b, and a slip mechanism 31c interposed therebetween. The larger gear 31a and the smaller gear 31b are mounted coaxially on a shaft 31d which is fixed to and extends downwardly from the chassis 8. As shown in FIG. 3, the gear 16 mounted on the take-up capstan 2 is held in mesh with the larger gear 31a. A stationary reversal gear 32 is held in mesh with the gear 7b of the supply reel base 7.

Figure 4:
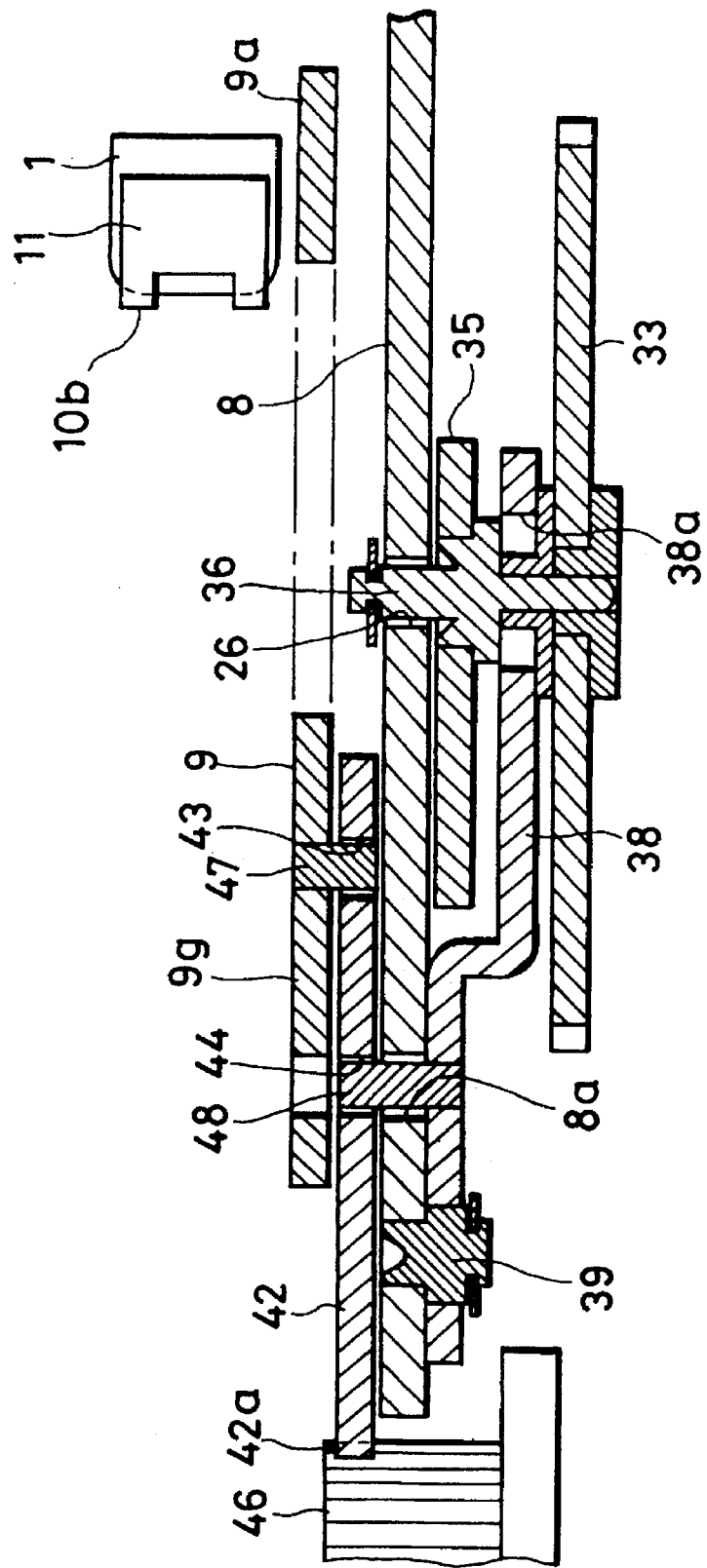
FIG. 4 is a vertical cross-sectional view of the tape transport mechanism shown in FIG. 3.
Figure 6:
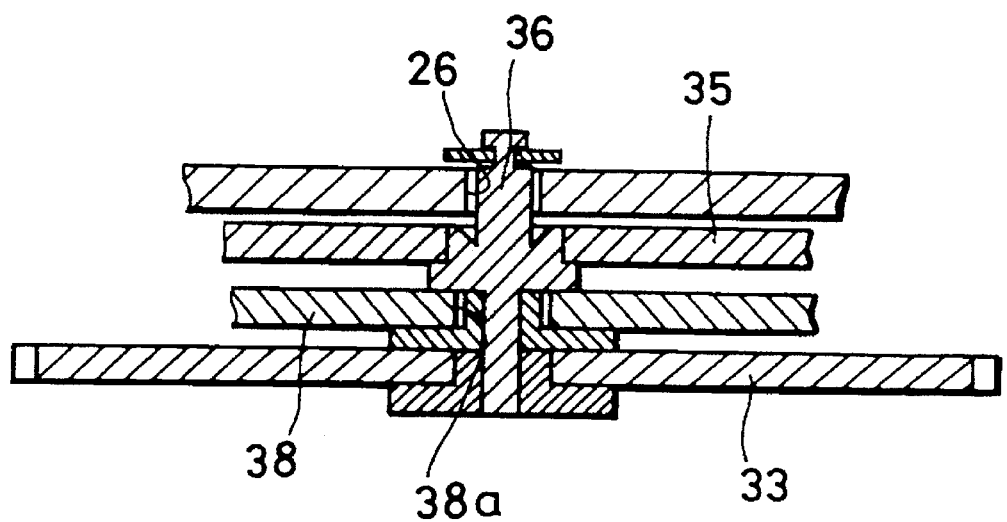
FIG. 6 is a vertical cross-sectional view of a first relay gear in the tape transport mechanism shown in FIG. 3.

A first relay gear 33 which can selectively mesh with the gear 17 on the supply capstan 3 and the smaller gear 31b of the gear assembly 31 is held in mesh with a second relay gear 34 which can selectively mesh with the gear 6b of the take-up reel base 6 and the stationary reversal gear 32. The first and second relay gears 33, 34 are rotatably supported on a gear lever 35 by respective shafts 36, 37, making up a switching relay assembly. The shafts 36, 37 movably engage in respective first and second guide holes 26, 27 (see also FIGS. 4 and 6) which are defined in the chassis 8.

The first and second guide holes 26, 27 are of an arcuate shape and positioned in confronting relation to each other as shown in FIGS. 2 and 3. The second guide hole 27 is defined by a first arcuate edge 27a extending about an end "Q" of the first guide hole 26, and a second arcuate edge 27b extending about an opposite end "P" of the first guide hole 26.

As shown in FIG. 2, the shaft 36 engages in a slot 38a defined in an end of a first change lever 38 and extending in the forward and backward directions "a", "b". The first change lever 38 is pivotally attached at its other end to the lower surface of a rear portion of the chassis 8 by a pivot shaft 39.

The shaft 37 engages in a slot 40a defined in an end of a second change lever 40 and extending in the forward and backward directions "a", "b". The second change lever 40 is pivotally attached at its intermediate portion to the lower surface of the rear portion of the chassis 8 by a pivot shaft 41.

A mode lever 42 (see FIGS. 2 and 4) is mounted on the upper surface of the rear portion of the chassis 8 below a rear side member 9g of the head base 9, for lateral movement in the directions "c", "d". The mode lever 42 has a rack 42a on its rear edge, and also has a head base operating cam slot 43, a first change lever operating cam slot 44, and a second change lever operating cam slot 45 which are defined in an intermediate region of the mode lever 42.

The rack 42a of the mode lever 42 is held in mesh with a rotary switch gear 46, and they constitute a tape drive mode switching mechanism for switching between various modes (described later on). When the rotary switch gear 46 rotates through a certain angle, the mode lever 42 is moved a certain interval in the direction "c" or "d". An operating pin 47 mounted on the rear side member 9g of the head base 9 engages in the head base operating cam slot 43. Operating pins 48, 49 mounted respectively on the first and second change levers 38, 40 engage respectively in the first and second change lever operating cam slots 44, 45 through respective through holes 8a, 9a which are defined in the chassis 8 and the head base 9, respectively.

An interlock pin 50 is mounted on the other end of the second change lever 40 and engages in a slot 22a defined laterally in a rear end of the interlock lever 22 on the lower surface of the rear portion of the chassis 8.

As shown in FIG. 1, a cassette housing 51 for holding an inserted tape cassette (no shown) is supported by a housing hanger 52 for vertical movement with respect to the tape transport which includes the capstans 2, 3, the reel drive shafts 6a, 7a, and the guide posts 24, 25 on the upper surface of the chassis 8. The cassette housing 51 has a drawing lever mechanism 53 for taking a tape cassette into and out of the cassette housing 51 in response to vertical movement of the cassette housing 51. The housing hanger 52 and the drawing lever mechanism 53 can be operated by a loading mechanism 54. The loading mechanism 54 and the rotary switch gear 46 (see FIG. 2) can be actuated by a control motor 55.

Figure 7:
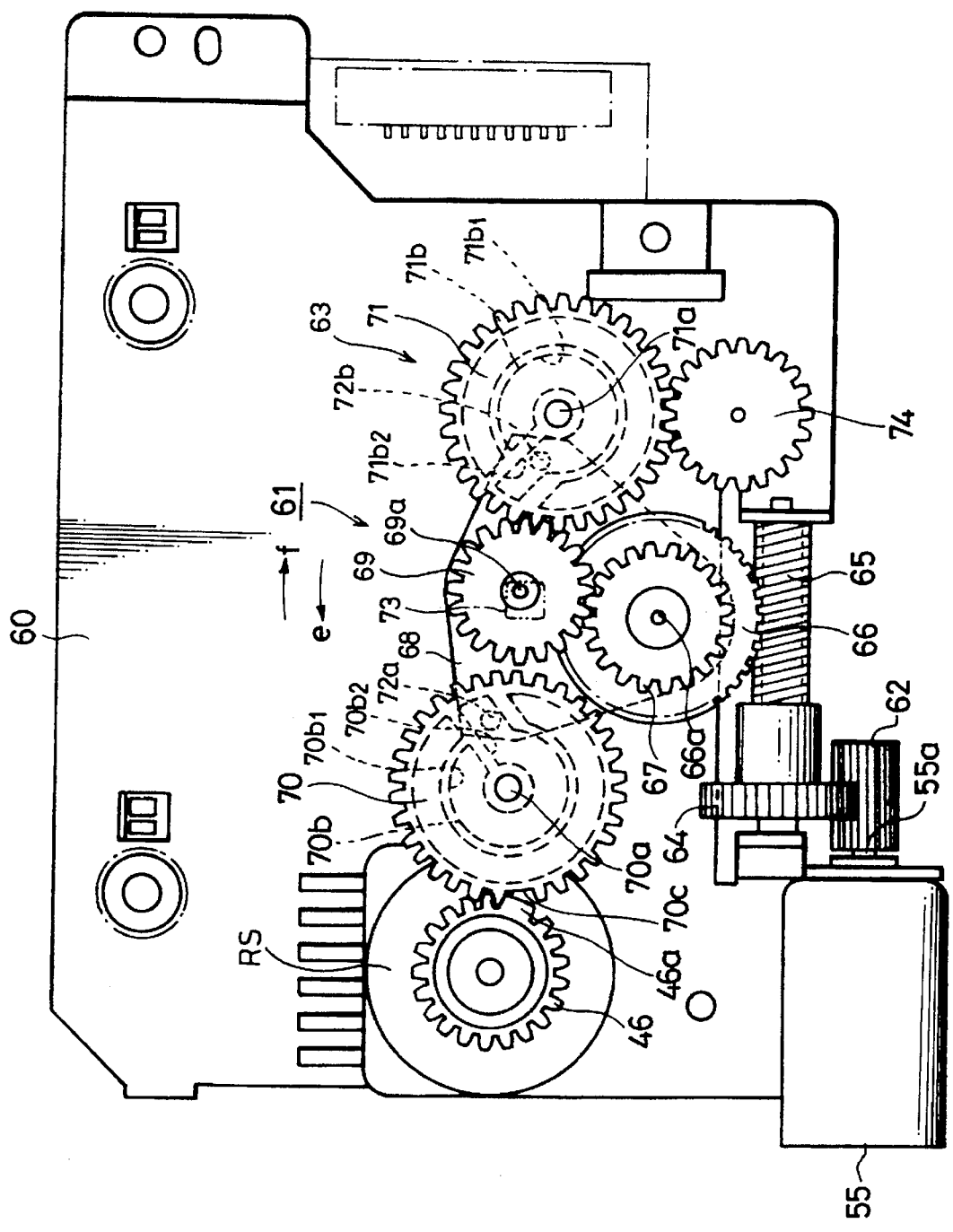
FIG. 7 is a plan view of a control mechanism.
Figure 8:
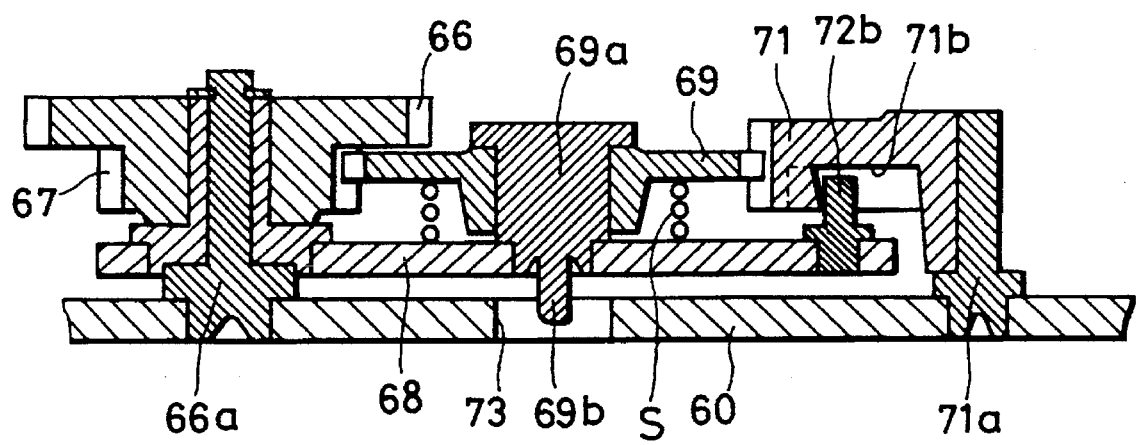
FIG. 8 is a vertical cross-sectional view of a drive gear assembly in the control mechanism shown in FIG. 7.

As shown in FIGS. 7 and 8, a drive control mechanism 61 is supported on the lower surface of the chassis 8 by a base plate 60.

The drive control mechanism 61 is operatively coupled to the control motor 55 which can actuate the loading mechanism 54 and the rotary switch gear 46. The control motor 55 has a motor shaft 55a to which a motor gear 62 is force-fitted. The drive control mechanism 61 comprises a drive gear group 63 which can be rotated by the control motor 55 through the motor gear 62.

Specifically, the motor gear 62 is held in mesh with a transmitting gear 64 to which a worm gear 65 is coaxially fixed. The worm gear 65 meshes with a worm wheel 66 rotatably mounted on the base plate 60 by a shaft 66a, the worm wheel 66 having an integral gear 67 coaxial therewith. A swing lever 68 is angularly movably supported on the shaft 66a and supports a switching gear 69 rotatably mounted thereon by a shaft 69a in mesh with the gear 67. A spring S (see FIG. 8) is disposed between the swing lever 68 and the switching gear 69 for generating frictional forces therebetween.

A switching gear 70 and a loading gear 71 are rotatably mounted on the base plate 60 by respective shafts 70a, 71a, one on each side of the switching gear 69. The switching gear 70 is held in mesh with the rotary switch gear 46. The switching gear 70 and the loading gear 71 have respective guide grooves 70b, 71b defined in lower surfaces thereof. The guide grooves 70b, 71b are composed of respective circular groove sections $70b_1$, $71b_1$ extending around the shafts 70a, 71a, respectively, and respective relief groove sections $70b_2$, $71b_2$ extending radially outwardly from ends of the circular groove sections $70b_1$, $71b_1$, respectively. The guide grooves 70b, 71b receive therein engaging pins 72a, 72b, respectively, which project from opposite sides of the swing lever 68. The switching gear 69 has an axial end 69b (see FIG. 8) extending into a hole 73 defined in the base plate 60.

The switching gear 70 which meshes with the rotary switch gear 46 has a tooth-free region 60c, and the rotary switch gear 46 has a continuous gear tooth 46a to engage in the tooth-free region 60c for thereby keeping the switching gear 70 and the rotary switch gear 46 in correct mesh with each other.

The loading gear 71 is held in mesh with a loading drive gear 74 rotatably mounted on the base plate 60. The loading drive gear 74 meshes with a rack of a loading lever (not shown) of the loading mechanism 54.

The drive gear group 63 of the above construction operates as follows: When the control motor 55 is energized, the motor shaft 55a is rotated to cause the gears 62, 64 to rotate the worm gear 65 and the worm wheel 66. Depending on the direction in which the worm wheel 66 and hence the gear 67 rotate, the switching gear 69 meshing with the gear 67 angularly moves with the swing lever 68 in one direction or the other. Therefore, the switching gear 69 is selectively brought into mesh with the switching gear 70 or the loading gear 71, transmitting the rotation of the gear 67 to the switching gear 70 or the loading gear 71.

For example, if the worm wheel 66 and the gear 67 are rotated counterclockwise in FIG. 7, then the switching gear 67 rotates clockwise about the shaft 66a and is turned to the left in the direction indicated by the arrow "e". The swing lever 68 is also turned to the left in the direction indicated by the arrow "e", bringing the switching gear 69 into mesh with the switching gear 70 which is positioned on the left-hand side of the switching gear 69 in FIG. 7. At this time, the engaging pin 72a engaging in the guide groove 70b in the switching gear 70 moves from the relief groove section $70b_2$ into the circular groove section $70b_1$, whereupon the switching gear 70 is made rotatable. The rotation of the switching gear 69 is transmitted to the switching gear 70, which is rotated about the shaft 70a to rotate the rotary switch gear 46 that is held in mesh with the switching gear 70.

Since the swing lever 68 is also turned to the left in the direction "e", the engaging pin 72b slidingly engaging in the guide groove 71b in the loading gear 71 remains positioned in the relief groove section $71b_2$ of the guide groove 71b. Therefore, the loading gear 71 is locked against rotation, and the loading drive gear 74 is also locked against rotation, holding the loading mechanism 54 immovable.

In this manner, the rotary switch gear 46 is rotated by the rotation transmitted from the switching gear 69 to the switching gear 70. After a rotary switch RS coupled to the rotary switch gear 46 is turned to a given position by the rotary switch gear 46, the control motor 55 is reversed. The switching gear 69 now tends to be angularly moved back toward the loading gear 71 by the gear 67. However, inasmuch as the engaging pin 72a on the swing lever 68 remains positioned in the circular groove section $70b_1$ of the guide groove 70b, the swing lever 68 is not turned, and the switching gear 69 remains in mesh with the switching gear 70. The switching gear 69 transmits the reverse rotation of the gear 67 to the switching gear 70 to reverse the switching gear 70, so that the rotary switch gear 46 is reversed.

When the switching gear 70 is reversed to its original angular position, the relief groove section $70b_2$ of the guide groove 70b is aligned with the engaging pin 72a on the swing lever 68. Since the engaging pin 72a can enter the relief groove section $70b_2$, the swing lever 68 is now released from the switching gear 70 for angular movement about the shaft 66a. The reversed rotation of the gear 67 now causes the swing lever 68 to turn, together with the switching gear 69, toward the loading gear 71 in the direction indicated by the arrow "f".

As shown in FIG. 7, the switching gear 69 is brought into mesh with the loading gear 71. The engaging pin 72a on the swing lever 68 engages in the relief groove section $70b_2$ of the guide groove 70b in the switching gear 70, whereas the engaging pin 72b on the swing lever 68 moves from the relief groove section $71b_2$ of the guide groove 71b in the loading gear 71 into the circular groove section $71b_1$ thereof.

The rotation of the control motor 55 is transmitted through the worm wheel 66, the gear 67, and the switching gear 69 to the loading gear 71, which is rotated clockwise about the shaft 71a with the engaging pin 72b slidingly engaging in the circular groove section $71b_1$ of the guide groove 71b. At this time, because the engaging pin 72a engages in the relief groove section $70b_2$ of the guide groove 70b, the switching gear 70 is locked against rotation, and hence the rotary switch gear 46 is also locked against rotation.

The loading drive gear 74 is rotated counterclockwise by the loading gear 71, thereby operating the loading mechanism 54 in an unloading mode.

When the control motor 55 is reversed again to rotate the loading gear 71 counterclockwise, the relief groove section $71b_2$ of the guide groove 71b becomes aligned with the engaging pin 72b on the swing lever 68. Then, the engaging pin 72b enters the relief groove section $71b_2$, and the swing lever 68 is turned in the direction "e". The switching gear 68 is moved into mesh with the switching gear 70. At the same time, the engaging pin 72a moves from the relief groove section $70b_2$ into the circular groove section $70b_1$, making the switching gear 70 rotatable. The engaging pin 72b engages in the relief groove section $71b_2$, making the loading gear 71 nonrotatable.

The counterclockwise rotation of the loading gear 71 rotates the loading drive gear 74 clockwise, operating the loading mechanism 54 in a loading mode.

Figure 9:
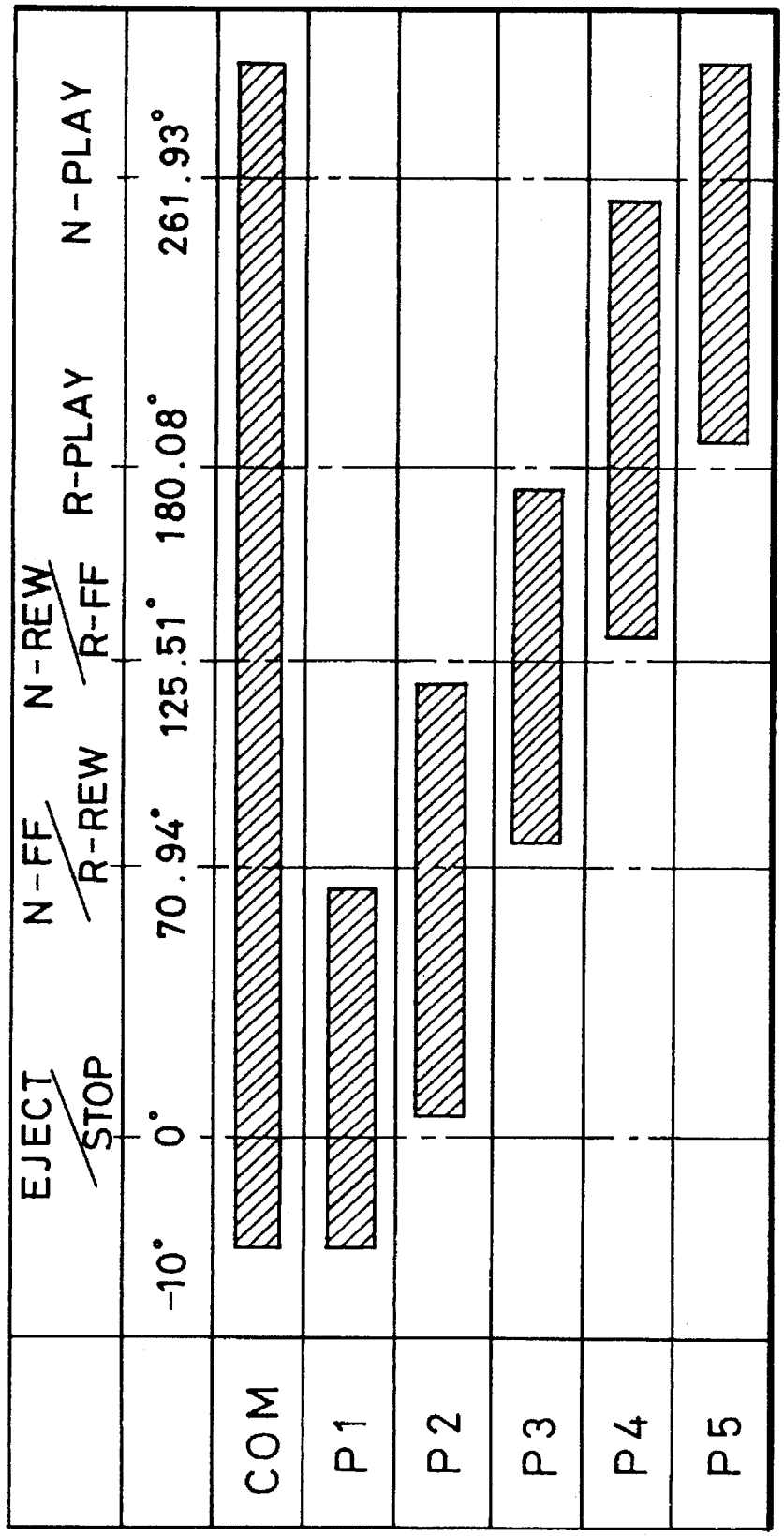
FIG. 9 is a table of codes for a rotary switch gear in the control mechanism shown in FIG. 7.

The rotary switch RS coupled to the rotary switch gear 46 can detect angles as shown in FIG. 9. Signals from the rotary switch RS which indicate detected angles thereof are read by a microcomputer (not shown) that is part of the cassette tape player, which then rotates the control motor 55 in one direction or the other and also turns on and off the control motor 55 for positioning various parts of the tape transport in various modes, i.e., eject/stop modes (EJECT/STOP), normal fast-feed/reverse rewind modes (N-FF/R-REW), normal rewind/reverse fast-feed modes (N-REW/R-FF), a reverse constant-speed feed mode (R-PLAY), and a normal constant-speed feed mode (N-PLAY).

Operation of the cassette tape player of the above construction will be described below.

The cassette tape player operates successively from the eject mode (EJECT) to the stop mode (STOP) to the normal fast-feed mode (N-FF)/reverse rewind mode (R-REW) to the normal rewind mode (N-REW)/reverse fast-feed mode (R-FF) to the reverse constant-speed feed mode (R-PLAY) to the normal constant-speed feed mode (N-PLAY). The cassette tape player also operates in a reversed succession of the modes, i.e., from (N-PLAY) to (R-PLAY) to (N-REW) /(R-FF) to (N-FF)/(R-REW) to (STOP) to (EJECT).

FIG. 2 shows the parts of the cassette tape player when it operates in the eject/stop modes (EJECT/STOP). In these modes, the mode lever 42 is in a first position (starting position) $42_1$, and the magnetic head 1 and the pinch rollers 4, 5 are spaced from the position where a cassette tape T is transported. Specifically, the operating pin 47 mounted on the rear side member 9g of the head base 9 engages in a front step portion 43a of the head base operating cam slot 43 in the mode lever 42, so that the head base 9 is displaced forward in the direction "a" and hence the magnetic head 1 is spaced forward from the position where the cassette tape T is transported.

The pinch roller levers 4a, 5a are angularly moved forward in the direction "a" by the stoppers 4b, 5b due to the forward displacement of the head base 9, and the pinch rollers 4, 5 are also spaced forward from the position where the cassette tape T is transported.

The operating pin 48 mounted on the first change lever 38 on which the first relay gear 33 is rotatably supported by the shaft 36, and the operating pin 49 mounted on the second change lever 40 on which the second relay gear 34 is rotatably supported by the shaft 37 engage respectively in rear step portions 44a, 45a of the respective first and second change lever operating cam slots 44, 45 that are defined in the mode lever 42. In this condition, as shown in FIG. 3, the first relay gear 33 is held in mesh with the gear 17 which is attached to the flywheel 13 of the supply capstan 3 through the slip mechanism, and the second relay gear 34 is held in mesh with the gear 6b of the take-up reel base 6.

A tape cassette is now loaded or unloaded. To load the tape cassette, the tape cassette is inserted into the cassette housing 51 shown in FIG. 1, whereupon the control motor 55 is energized. Upon energization of the control motor 55, the loading gear 71 of the drive control mechanism 61 shown in FIG. 7 is rotated counterclockwise, rotating the loading drive gear 74 to operate the loading mechanism 54. The housing hanger 52 is lowered and the drawing lever mechanism 53 is actuated to draw the tape cassette into the cassette housing 51, which is lowered to place the tape cassette onto the chassis 8 with its reel hubs fitted respectively over the reel drive shafts 6a, 7a.

Figure 10:
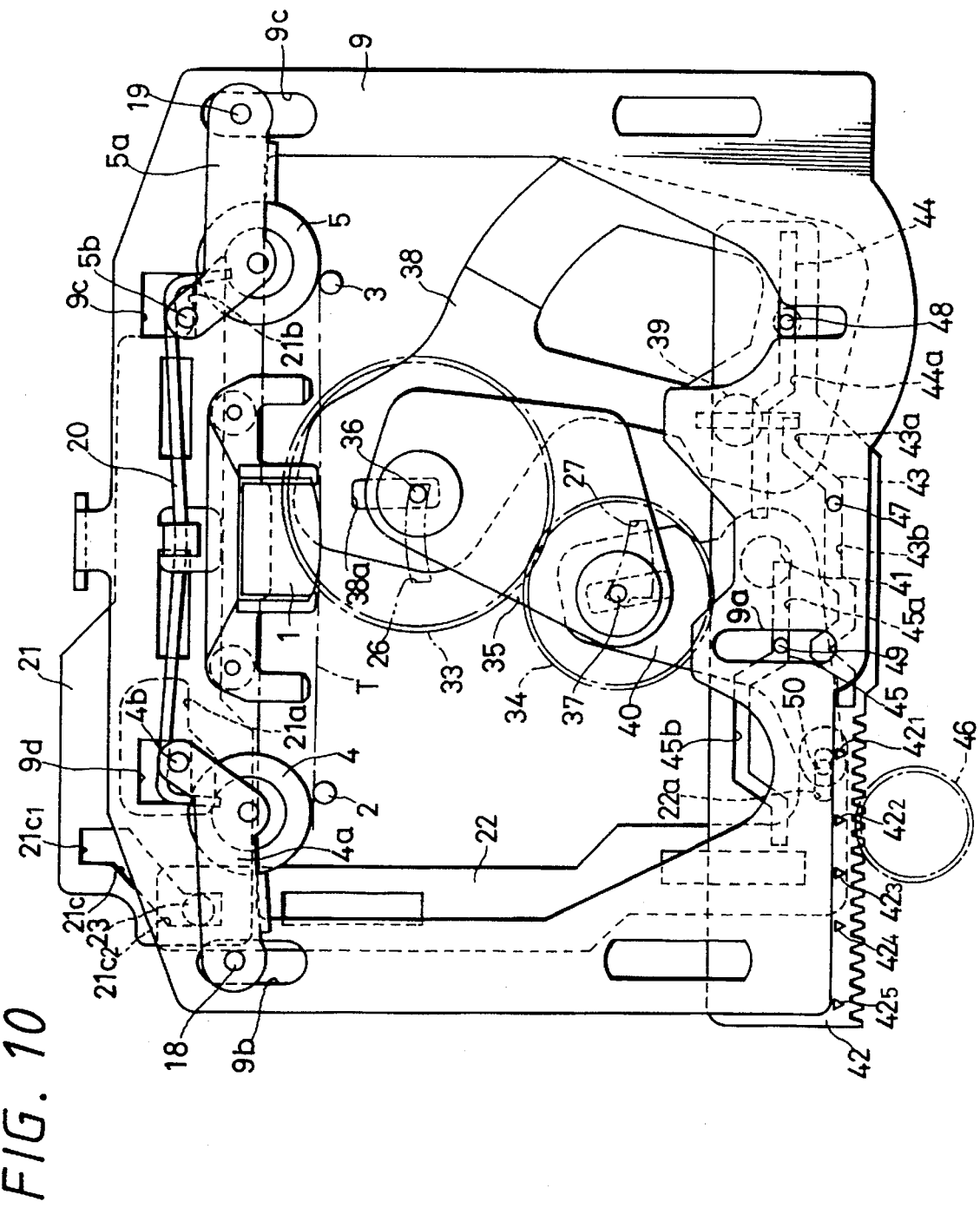
FIG. 10 is a plan view of the switching mechanism, showing its parts positioned in normal fast-feed/reverse rewind modes.

FIGS. 3 and 10 show the parts of the cassette tape player when it operates in the normal fast-feed mode (N-FF)/ reverse rewind mode (R-REW). In these modes, the rotary switch gear 46 is rotated by the control motor 55 until an angle set by the rotary switch RS is reached, so that the mode lever 42 is moved to a second position $42_2$ as shown in FIG. 10. A middle step portion 43b of the head base operating cam slot 43 is slidingly engaged by the operating pin 47, moving the head base 9 backward in the direction "b" short of its full stroke. The magnetic head 1 is now displaced closely to the position where the cassette tape T is transported, and can pick up signals recorded on the cassette tape T. Upon the backward movement of the head base 9, the pinch roller levers 4a, 5a are turned backward in the direction "b" by the spring 20 acting on the stoppers 4b, 5b for thereby positioning the pinch rollers 4, 5 closely to the position where the cassette tape T is transported, i.e., closely to the respective capstans 2, 3.

In this condition, since the operating pins 48, 49 on the first and second change levers 38, 40 are continuously held in sliding engagement with the rear step portions 44a, 45a of the respective first and second change lever operating cam slots 44, 45 even with the mode lever 42 shifted to the second position $42_2$, the first and second change levers 38, 40 are not angularly moved. Therefore, the first relay gear 33 is held in mesh with the gear 17 attached to the flywheel 13 mounted on the supply capstan 3, and the second relay gear 34 is held in mesh with the gear 6b of the take-up reel base 6, as shown in FIG. 3. Consequently, the rotation of the supply capstan 3 is transmitted from the gear 17 through the first and second relay gears 33, 34 to the take-up reel base 6, which is rotated at a high speed.

Because the take-up reel base 6 is rotated at a high speed, the cassette tape T is in fast forward when it is transported in a normal direction, and high-speed rewound when it is transported in a reverse direction.

If the flywheel 13 rotates at a speed of 7.56 Hz, the gear 17 has a diameter of 18 mm, and the gear 6b of the take-up reel base 6 has a diameter of 15.2 mm, then the take-up reel base 6 is rotated at a speed of: $7.56 \times 18/15.2 \approx 8.95$ (Hz). Therefore, a C-60 cassette tape can be wound within about 90 seconds.

Figure 11:
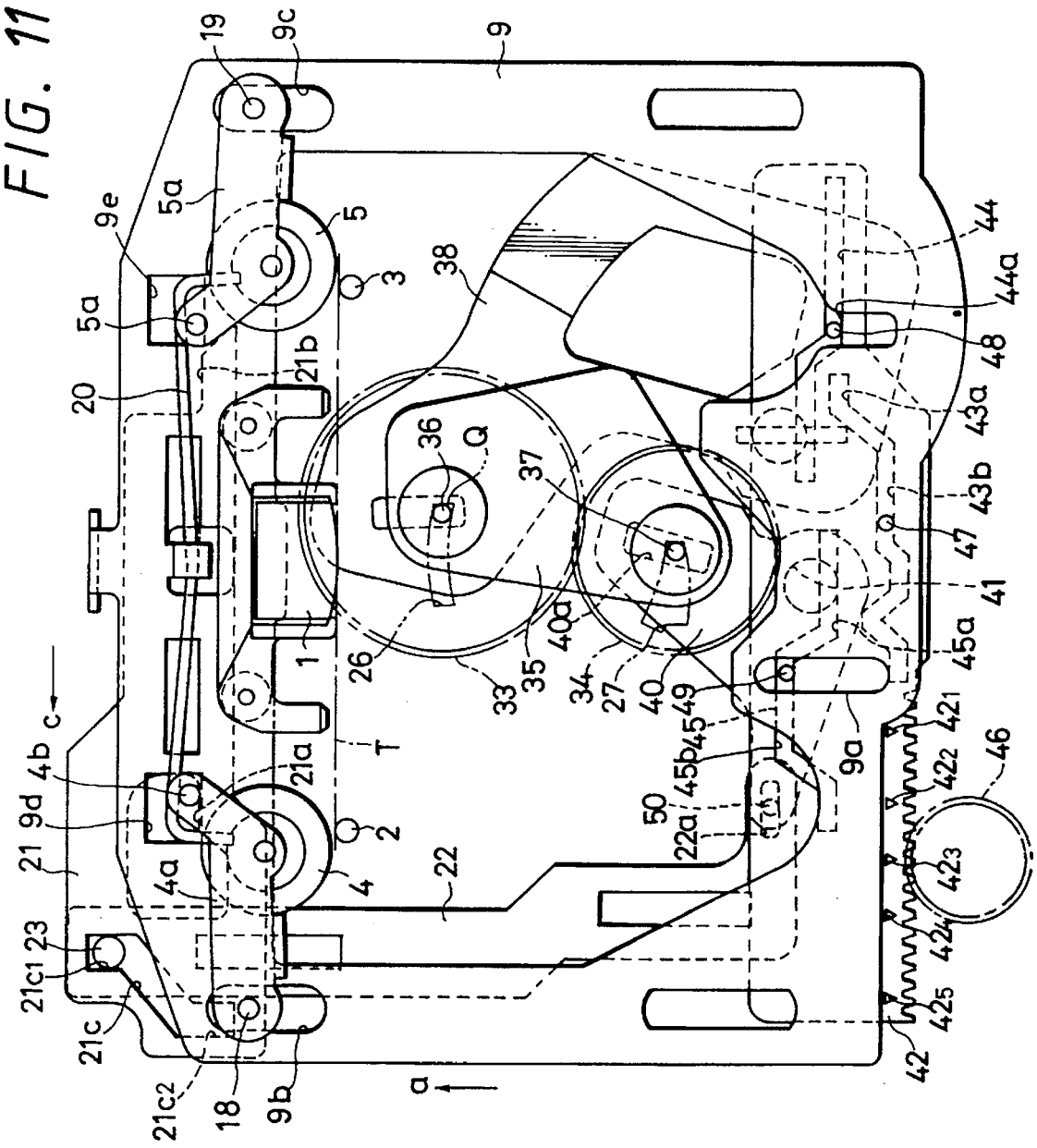
FIG. 11 is a plan view of the switching mechanism, showing its parts positioned in normal rewind/reverse fast-feed modes.
Figure 12:
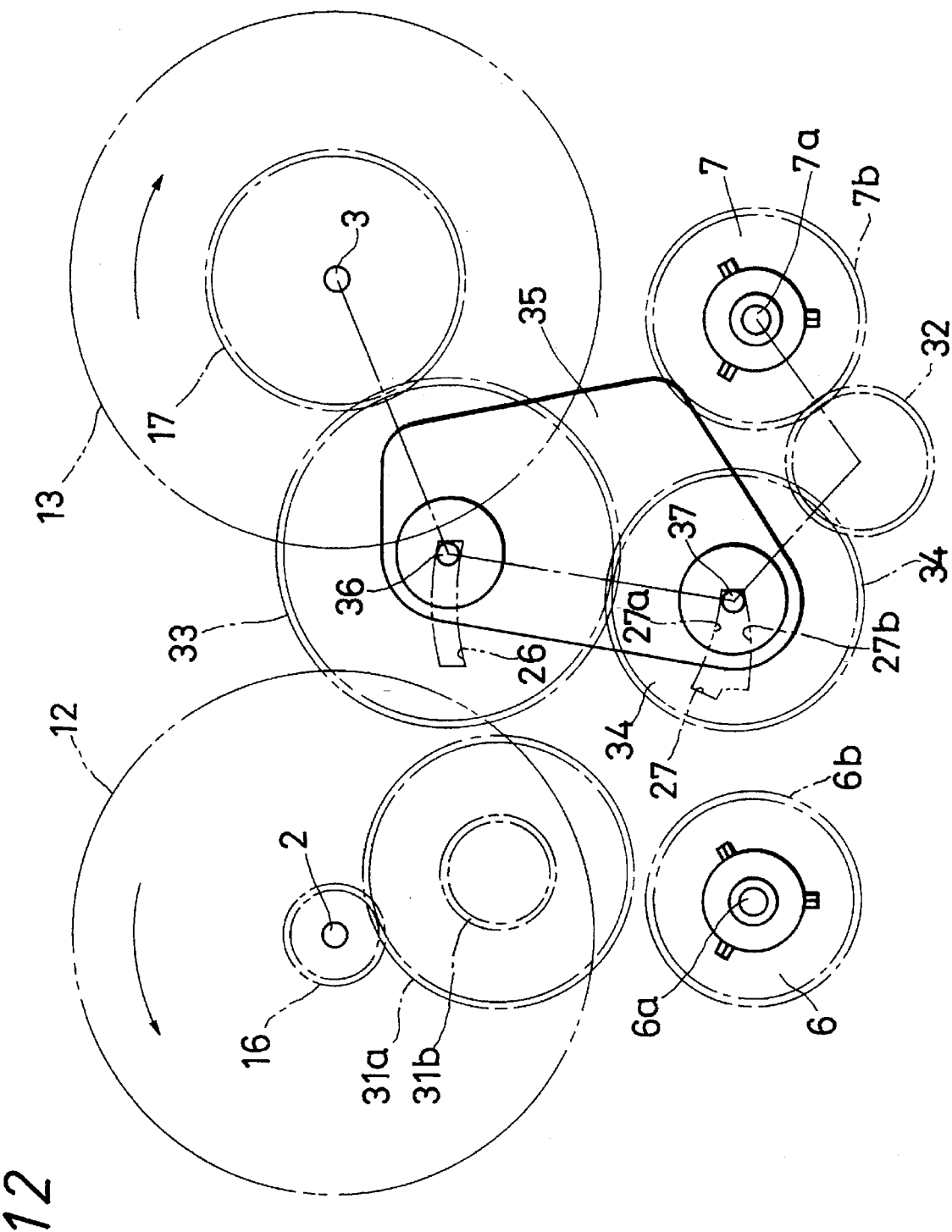
FIG. 12 is a plan view of the tape transport mechanism, showing its parts in the normal rewind/reverse fast-feed modes.

FIGS. 11 and 12 show the parts of the cassette tape player when it operates in the normal rewind mode (N-REW)/ reverse fast-feed mode (R-FF). In these modes, as shown in FIG. 11, the mode lever 42 is moved to a third position $42_3$ by the rotary switch gear 46. Upon the movement of the mode lever 42 to the third position $42_3$, the operating pin 47 remains in sliding engagement with the middle step portion 43b of the head base operating cam slot 43, and hence the head base 9 is not moved. The magnetic head 1 and the pinch rollers 4, 5 remain in the same position as described above (see FIG. 10).

The first change lever 38 engaging the first relay gear 33 is not angularly moved because the operating pin 48 is continuously held in sliding engagement with the rear step portion 44a of the first change lever operating cam slot 44. The first relay gear 33 remains held in mesh with the gear 17 mounted on the supply capstan 17 as shown in FIG. 12.

The second change lever 40 engaging the second relay gear 34 is angularly moved clockwise about the pivot shaft 41, as shown in FIG. 11, because the operating pin 49 is slidingly engaged by the front step portion 45b of the second change lever operating cam slot 45 and is pushed forward.

The angular movement of the second change lever 40 presses the shaft 37 of the second relay gear 34 which engages in the slot 40a. Therefore, the gear lever 35 is turned about the shaft 36 of the first relay gear 33 until the shaft 37 of the second relay gear 34 engages the end of the second guide hole 27 which is closer to the supply capstan 3. At this time, the shaft 36 engages the end "Q" of the first guide hole 26 which is closer to the supply capstan 3.

This turning movement of the gear lever 35 brings the second relay gear 34 into mesh with the stationary reversal gear 32 which is held in mesh with the gear 7b of the supply reel base 7. Now, the rotation of the gear 17 is transmitted through the first and second relay gears 33, 34 and the stationary gear reversal 32 to the supply reel base 7. Therefore, the supply reel base 7 is rotated at a high speed to rewind the cassette tape T when it is transported in a normal direction or fast feed the cassette tape T when it is transported in a reverse direction. The rotational speed of the supply reel base 7 at this time is the same as the rotational speed of the take-up reel base 6 as described above.

When the second change lever 40 is turned clockwise in FIG. 11 about the pivot shaft 41, as shown in FIG. 11, the interlink lever 22 is pushed forward in the direction "a" in FIG. 11 by the interlock pin 50 that engages in the slot 22a in the rear end of the interlock lever 22. The cam pin 23 mounted on the front end of the interlink lever 22 slides forward in the cam groove 21c defined in the pinch roller switching lever 21 until it engages the front end $21c_1$ that is positioned inwardly of the rear end $21c_2$ thereof. Consequently, the pinch roller switching lever 21 is displaced in the direction "c" in FIG. 11, causing the engaging edge 21a thereof to abut against the stopper 4b of the pinch roller lever 4a. At this time, the stopper 5b of the pinch roller lever 5a disengages from the engaging edge 21b, but engages in the hole 9e in the head base 9.

Figure 13:
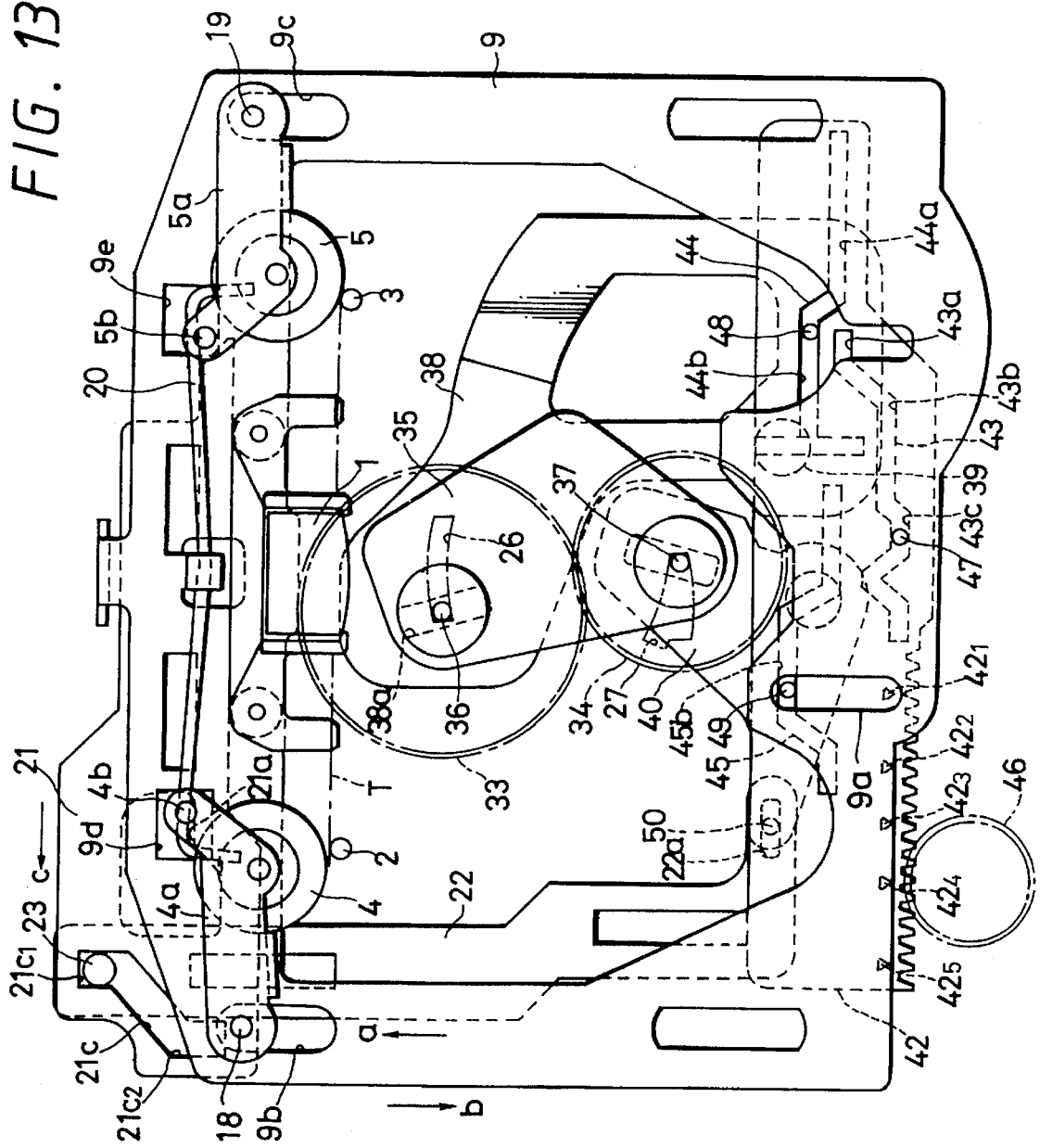
FIG. 13 is a plan view of the switching mechanism, showing its parts positioned in a reverse constant-speed feed mode.
Figure 14:
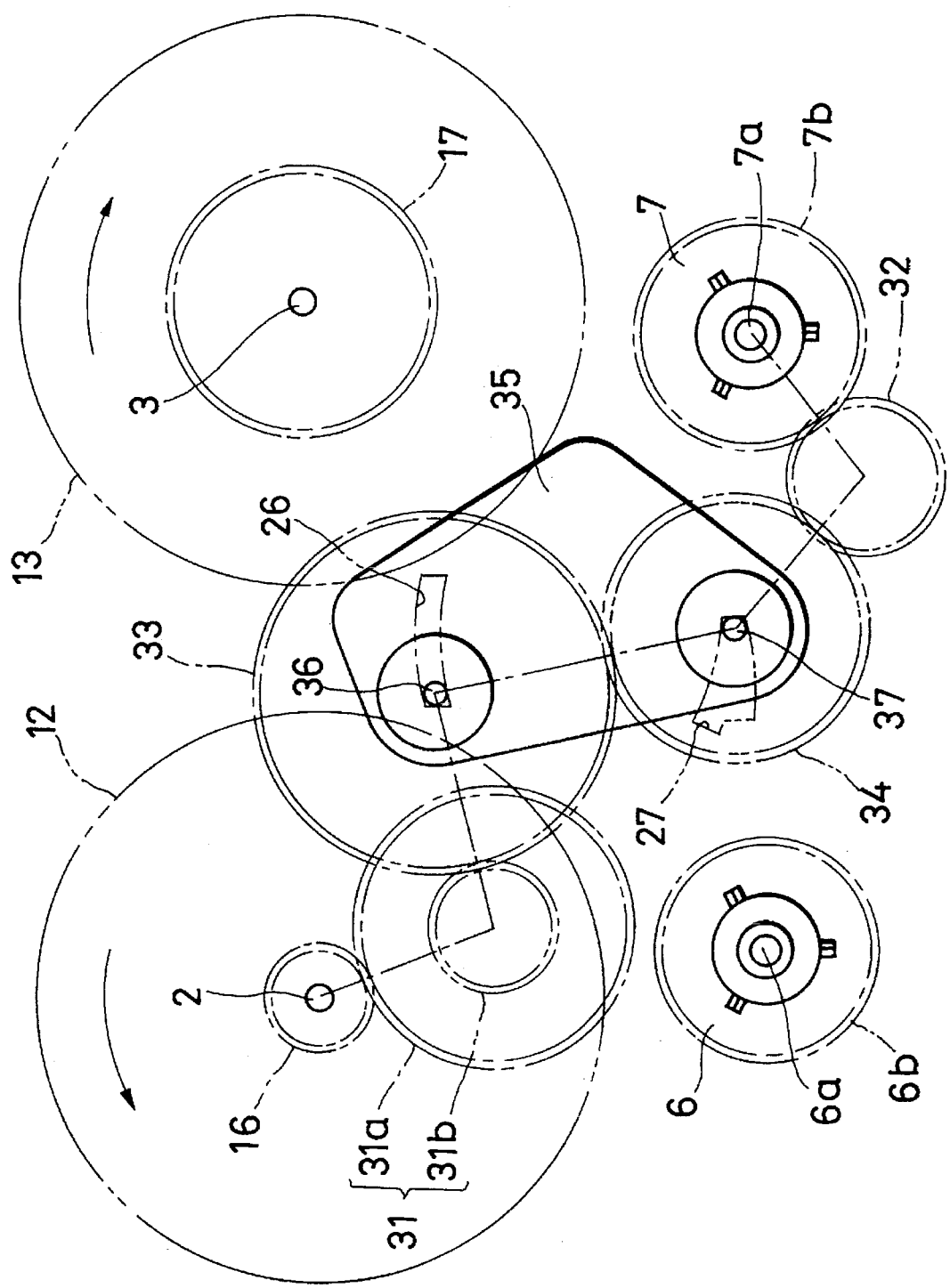
FIG. 14 is a plan view of the tape transport mechanism, showing its parts in the reverse constant-speed feed mode.

FIGS. 13 and 14 illustrate the parts of the cassette tape player when it operates in the reverse constantspeed feed mode (R-PLAY). In this mode, as shown in FIG. 13, the mode lever 42 is moved to a fourth position $42_4$ by the rotary switch gear 46. Upon the movement of the mode lever 42 to the fourth position $42_4$, the operating pin 47 on the slide base 9 is engaged by a rear step portion 43c of the head base operating cam slot 43. The operating pin 47 is pushed backward, and the head base 9 is also displaced backward in the direction "b", bringing the magnetic head 1 into the position where the cassette tape T is transported. The magnetic head 1 is now held in contact with the cassette tape 1. The backward movement of the head base 9 tends to cause the pinch roller levers 4a, 5a to be pushed backward in the direction "b" by the spring 20. Since the stopper 4b of the pinch roller lever 4a has been engaged by the engaging edge 21a of the pinch roller switching lever 21 which has been shifted in the direction "c", the pinch roller lever 4a is prevented from being turned, and the pinch roller 4 is not moved backward in the direction "b". Only the pinch roller 5 is moved backward in the direction "b" by turning movement of the pinch roller lever 5a, and presses the cassette tape T against the supply capstan 3.

Concurrent with the above operation, the first change lever 38 which engages the first relay gear 33 is turned counterclockwise in FIG. 13 about the pivot shaft 39 because the operating pin 48 is engaged by a front step portion 44b of the first change lever operating cam slot 44 and moved forward in the direction "a".

At this time, the second change lever 40 which engages the second relay gear 34 is locked against angular movement because the operating pin 49 remains engaged by a front step portion 45b of the second change lever operating cam slot 45. Therefore, the second relay gear 34 remains in mesh with the stationary reversal gear 32 as shown in FIG. 14.

Only the first change lever 38 is angularly moved, causing the slot 38a thereof to guide the shaft 36 of the first relay gear 33. The gear lever 35 is now angularly moved about the shaft 37 of the second relay gear 34 which is engaged by the end of the second guide hole 27 which is closer to the supply capstan 3. Therefore, the shaft 36 of the first relay gear 33 is shifted to the end of the first guide hole 26 which is closer to the take-up capstan 2.

As shown in FIG. 14, the first relay gear 33 is held in mesh with the smaller gear 31b of the gear assembly 31 whose larger gear 31a is always held in mesh with the gear 16 on the take-up capstan 2. The rotation of the take-up capstan 2 is now transmitted from the gear 16 that rotates with the flywheel 12 through the gear assembly 31, the first relay gear 33, the second relay gear 34, and the stationary reversal gear 32 to the supply reel base 7, which is rotated at a low speed.

If the flywheel 12 rotates at a speed of 7.56 Hz, the gear 16 has a diameter of 6.6 mm, the larger gear 31a has a diameter of 19.2 mm, the smaller gear 31b has a diameter of 8 mm, and the gear 7b has a diameter of 15.2 mm, then the supply reel base 7 is rotated at a speed of: $7.56 \times 6.6/19.2 \times 8/15.2 \approx 1.37$(Hz).

When the supply reel base 7 is thus rotated, the cassette tape T is transported at a constant speed from the take-up reel base 6 to the supply reel base 7 by the supply capstan 3 and the pinch roller 5. While the cassette tape T is being transported, signals can be recorded on and reproduced from the cassette tape T in the reverse direction.

Figure 15:
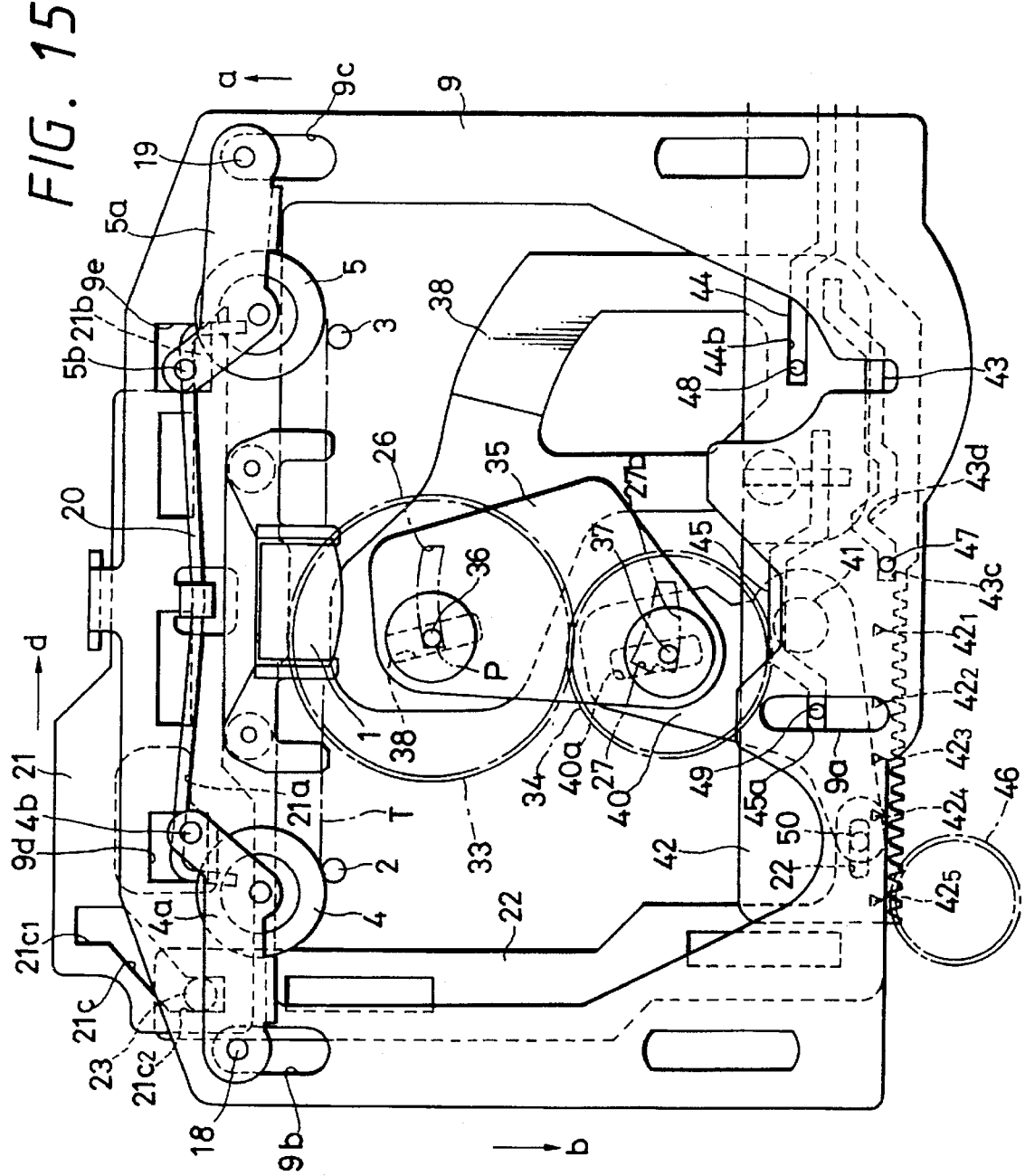
FIG. 15 is a plan view of the switching mechanism, showing its parts in the normal constant-speed feed mode.
Figure 16:
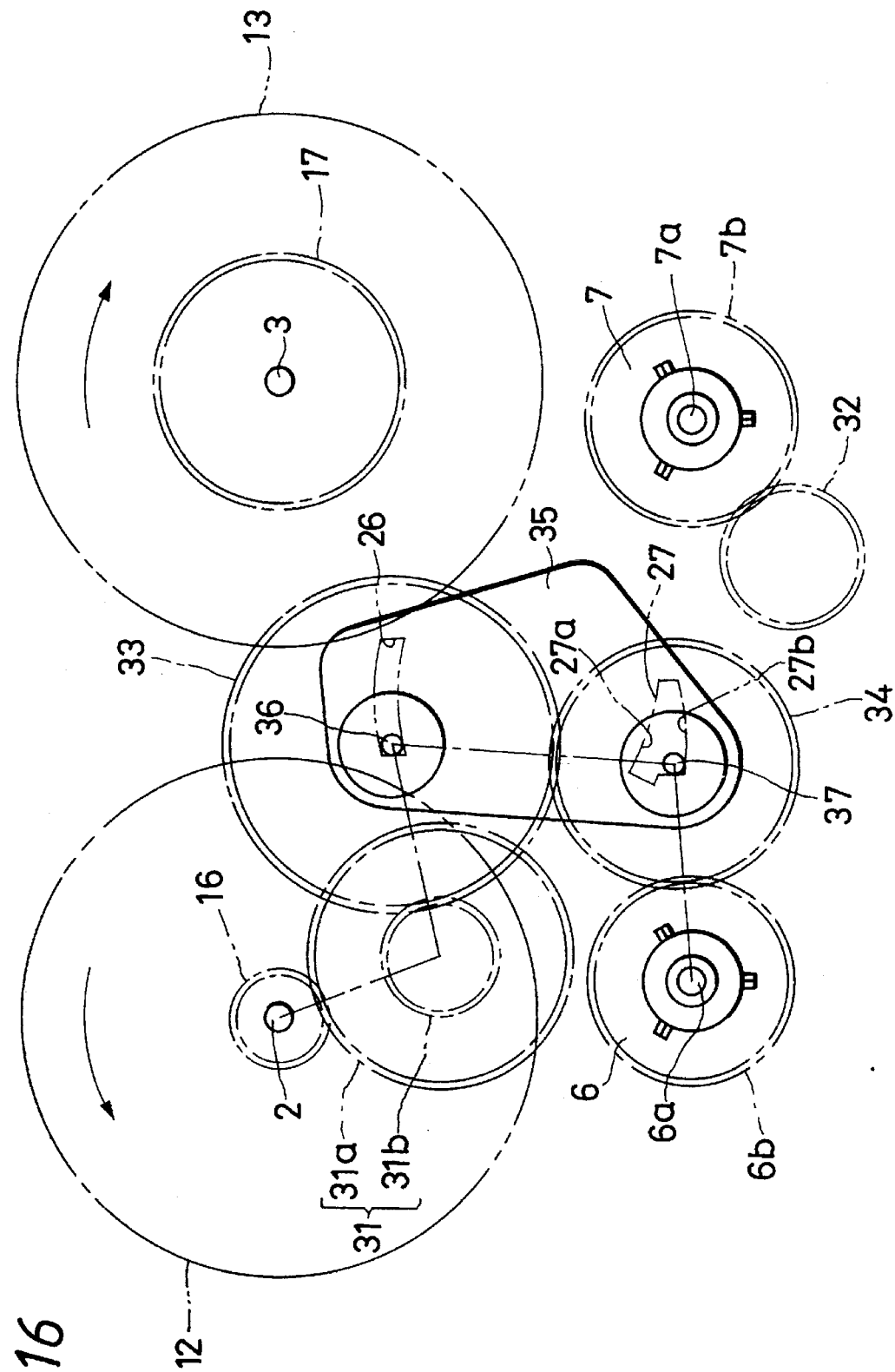
FIG. 16 is a plan view of the tape transport mechanism, showing its parts in the normal constant-speed feed mode.

FIGS. 15 and 16 show the parts of the cassette tape player when it operates in the normal constant-speed feed mode (N-PLAY). In this mode, as shown in FIG. 15, the mode lever 42 is moved from the fourth position $42_4$ to a fifth position $42_5$ by the rotary switch gear 46. Upon the movement of the mode lever 42 to the fifth position $42_5$, the operating pin 47 on the slide base 9 is engaged by the end of the rear step portion 43c of the head base operating cam slot 43. The rear step portion 43c has a central bend 43d projecting forward. Therefore, while the mode lever 42 is moving toward the fifth position $42_5$, the central bend 43d slidingly engages and pushes the operating pin 47 temporarily forward in the direction "a". The magnetic head 1 is therefore temporarily spaced from the position where the cassette tape T is transported, and the pinch roller lever 5a is also temporarily moved forward in the direction "a" away from the supply capstan 3 by the head base 9 through the stopper 5b.

Since the operating pin 48 is continuously engaged by the front step portion 44b of the first change lever operating cam slot 44, the first change lever 38 is not angularly moved. The second change lever 40 is turned counter-clockwise in FIG. 15 about the pivot shaft 41 because the operating pin 49 is engaged by the end of the rear step portion 45a of the second change lever operating cam slot 45.

When the second change lever 40 is angularly moved, the slot 40a thereof guides the shaft 37 of the second relay gear 34. The gear lever 35 is now angularly moved about the shaft 36 of the first relay gear 33 which is engaged by the end "P" of the first guide hole 26 which is closer to the take-up capstan 2. The shaft 37 of the second relay gear 34 is engaged by the end of the second arcuate edge 27b of the second guide hole 27 which is closer to the take-up capstan 2.

As shown in FIG. 16, the second relay gear 34 is held in mesh with the gear 6b of the take-up reel base 6. The rotation of the take-up capstan 2 is now transmitted from the gear 16 through the gear assembly 31, the first relay gear 33, and the second relay gear 34 to the take-up reel base 6, which is rotated at a low speed.

At this time, inasmuch as the second change lever 40 is being angularly moved counterclockwise, as shown in FIG. 15, the interlock lever 22 is moved backward in the direction "b". The backward movement of the interlock lever 22 causes the cam pin 23 mounted on its front end to move also backward in the direction "b" in the cam groove 21c defined in the pinch roller switching lever 21 until it engages the rear end $21c_2$ thereof which is positioned outwardly of the front end $21c_1$. The pinch roller switching lever 21 is now shifted inwardly in the direction "d".

When the pinch roller switching lever 21 is shifted inwardly in the direction "d", the engaging edge 21b thereof is engaged by the stopper 5b of the pinch roller lever 5a, which is locked against angular movement. The pinch roller 5 is therefore kept spaced away from the supply capstan 3.

The engaging edge 21 of the pinch roller switching lever 21 is displaced from its position facing the stopper 4b of the pinch roller lever 4a. Consequently, the pinch roller lever 4a is made angularly movable, allowing the pinch roller 4 to press the cassette tape T against the take-up capstan 2.

The cassette tape player is thus shifted from the reverse constant-speed feed mode (R-PLAY) to the normal constant-speed feed mode (N-PLAY). In the normal constant-speed feed mode (N-PLAY), the cassette tape T is transported at a constant speed from the supply reel base 7 to the take-up reel base 6 by the take-up capstan 2 and the pinch roller 4. While the cassette tape T is being transported, signals can be recorded on and reproduced from the cassette tape T in the normal direction.

As described above, upon switching from the reverse constant-speed feed mode (R-PLAY) to the normal constantspeed feed mode (N-PLAY), the head base 9 is temporarily moved forward in the direction "a" to release the pinch rollers 4, 5 from pressing contact with the respective capstans 2, 3. Therefore, the pinch roller switching lever 21 can operate smoothly, reducing forces required to move the pinch rollers 4, 5 in the mode switching.

As described above, the control motor 55 is energized to rotate the rotary switch gear 46 to switch from the stop mode (STOP) through the various intermediate modes to the normal constant-speed feed mode (N-PLAY). When the control motor 55 is reversed to reverse the rotary switch gear 46 in the normal constant-speed feed mode (N-PLAY), the cassette tape player switches from the normal constant-speed feed mode (N-PLAY) through the various intermediate modes to the stop mode (STOP).

It is also possible to return from any one of the various intermediate modes back to the stop mode (STOP).

The above operation of the cassette tape player will be described with reference to timing charts shown in FIGS. 17 through 25.

The loading mode is determined when a position switch is shifted from the eject mode (EJECT) to the stop mode (STOP), and is started when the control motor 55 is energized to rotate in the normal direction with the loading mechanism being switched.

Figure 17:
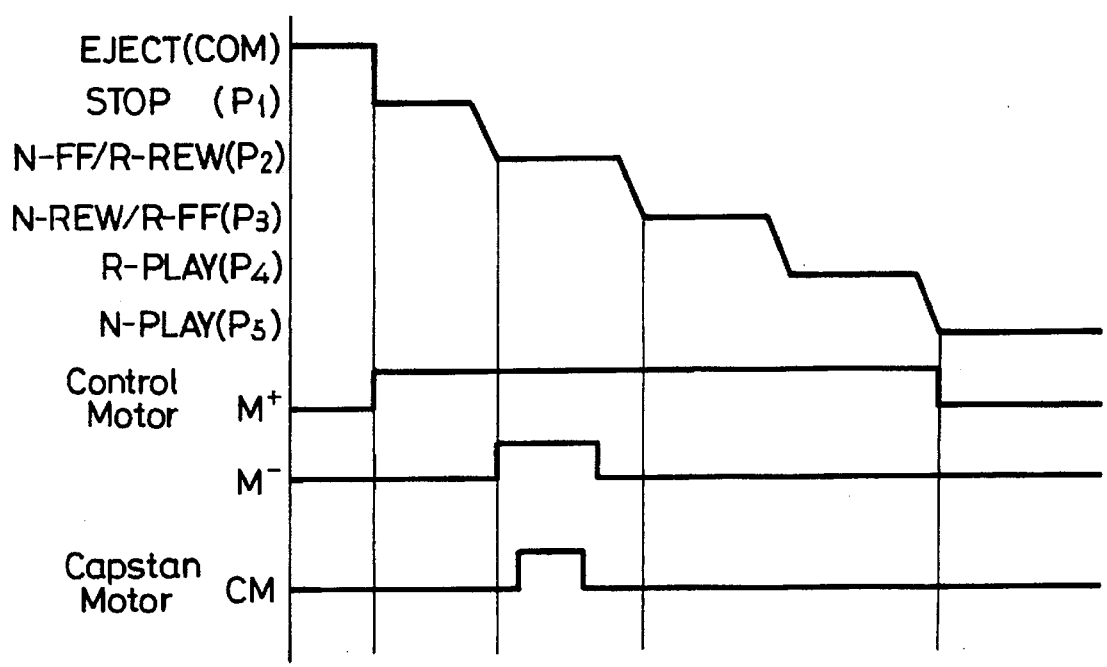
FIG. 17 is a timing chart illustrative of a loading mode.

Specifically, as shown in FIG. 17, when the control motor 55 is energized to rotate in the normal direction, the tape drive mode switching mechanism is moved to a position corresponding to the normal fast-feed mode (N-FF). Thereafter, a reverse control signal is given to the control motor 55 for rotating it in the reverse direction, with the result that the control motor 55 is stopped. The capstan motor 14 is then energized to tension the cassette tape T out of any slackened condition. After the cassette tape T has been tensioned, the application of the reverse control signal is stopped, whereupon the control motor 55 is rotated again in the normal direction. The tape drive mode switching mechanism is now moved to a position corresponding to the normal constant-speed feed mode (N-PLAY), for thereby transporting the cassette tape T in the normal direction while at the same time signals can be recorded on and reproduced from the cassette tape T.

Figure 18:
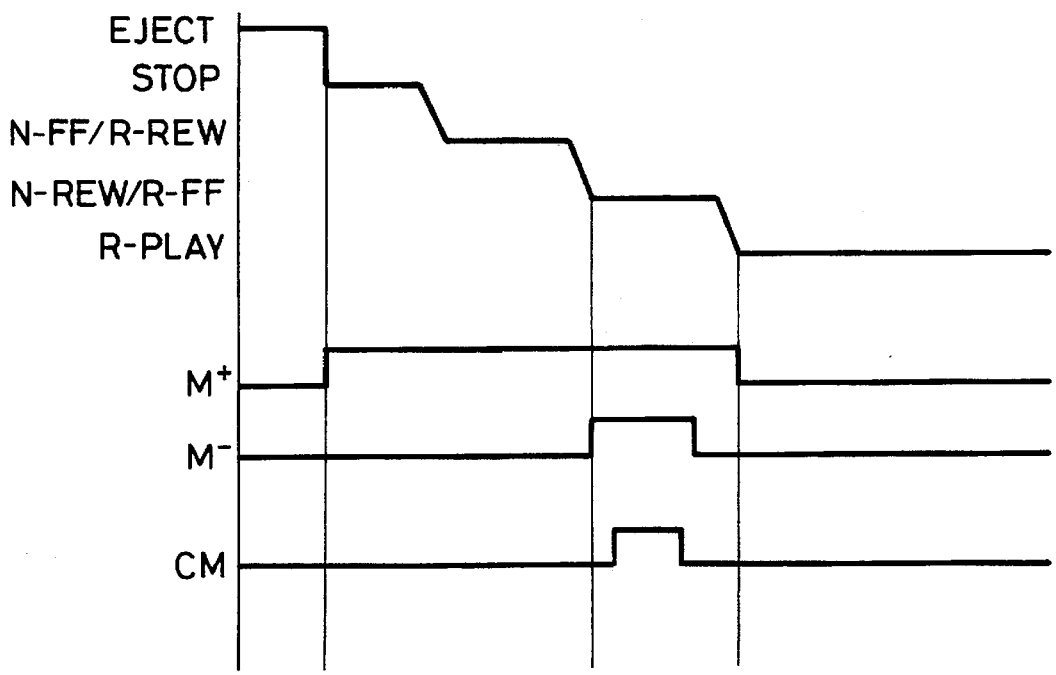
FIG. 18 is a timing chart illustrative of the reverse constant-speed feed mode.

In the reverse constant-speed feed mode (R-PLAY), as shown in FIG. 18, when the control motor 55 is energized to rotate in the normal direction, the tape drive mode switching mechanism is moved to a position corresponding to the normal rewind mode (N-REW). Thereafter, a reverse control signal is given to the control motor 55 for rotating it in the reverse direction, with the result that the control motor 55 is stopped. The capstan motor 14 is then energized to tension the cassette tape T out of any slackened condition. After the cassette tape T has been tensioned, the application of the reverse control signal is stopped, where-upon the control motor 55 is rotated again in the normal direction. The tape drive mode switching mechanism is now moved to a position corresponding to the reverse constant-speed feed mode (R-PLAY), for thereby transporting the cassette tape T in the reverse direction while at the same time signals can be recorded on and reproduced from the cassette tape T.

Figure 19:
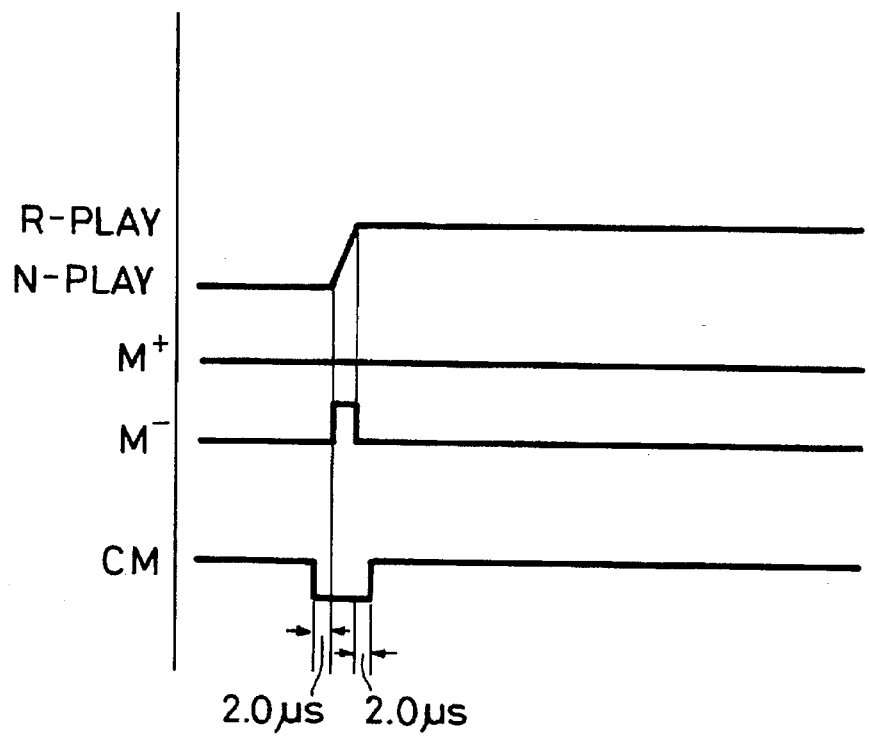
FIG. 19 is a timing chart illustrative of switching from the normal constant-speed feed mode to the reverse constant-speed feed mode.

For switching from the normal constant-speed feed mode (N-PLAY) to the reverse constant-speed feed mode (R-PLAY) while the cassette tape T is being transported at a constant speed (PLAY), the control motor 55 is reversed and the capstan motor 14 is de-energized, as shown in FIG. 19. The capstan motor 14 is de-energized for a period of time that is slightly longer than the period of time in which the control motor 55 is reversed, by about 2.0 μs before and after the reversal of the control motor 55, for the reason of slackening of the cassette tape T or the like.

Figure 20:
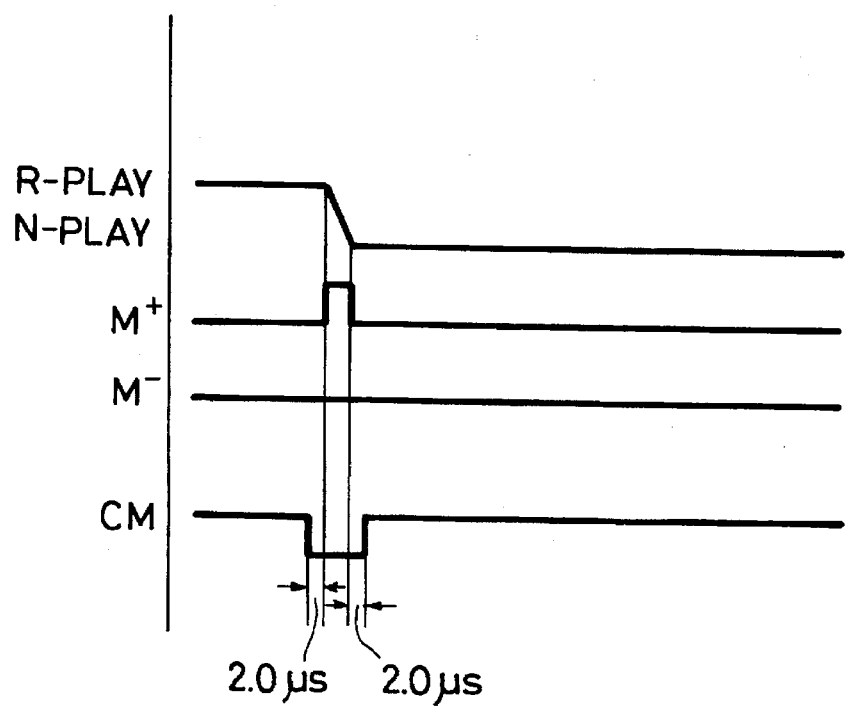
FIG. 20 is a timing chart illustrative of switching from the reverse constant-speed feed mode to the normal constant-speed feed mode.

For switching from the reverse constant-speed feed mode (R-PLAY) to the normal constant-speed feed mode (N-PLAY), the control motor 55 is rotated in the normal direction as shown in FIG. 20. The capstan motor 14 is also de-energized in the same manner as described above with reference to FIG. 19.

Figure 21:
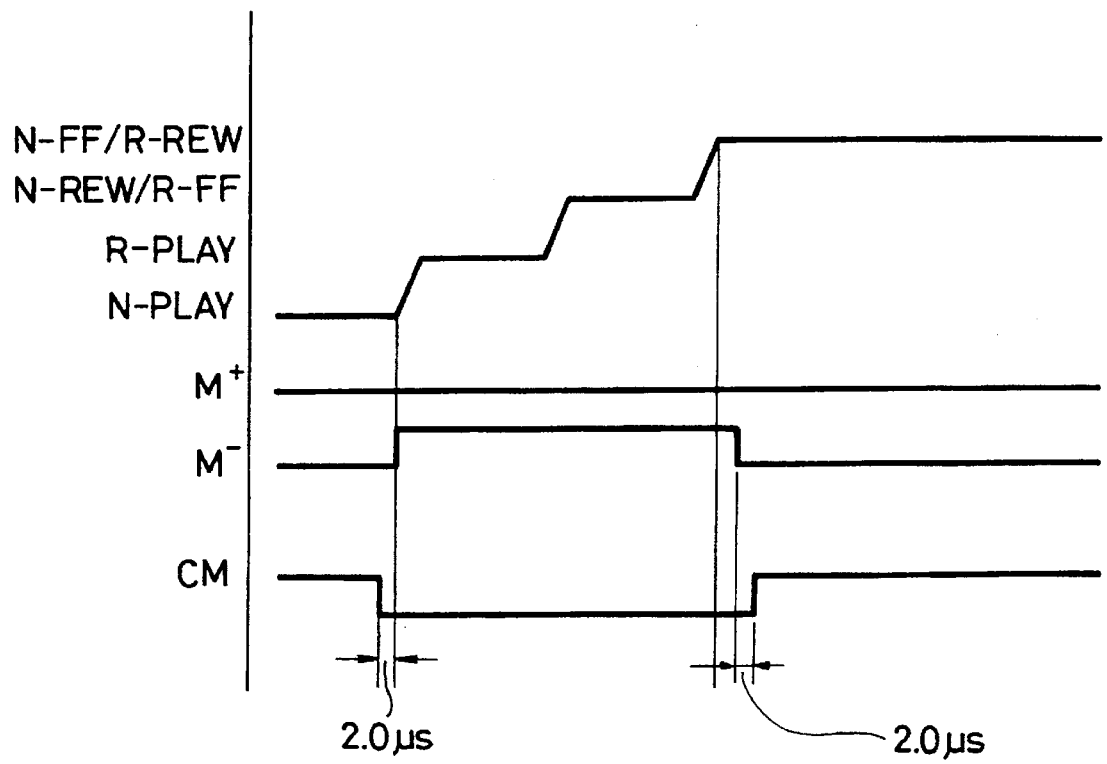
FIG. 21 is a timing chart illustrative of switching from the normal constant-speed feed mode to the normal fast-feed mode.

For switching from the normal constant-speed feed mode (N-PLAY) to the normal fast-feed mode (N-FF), the control motor 55 is reversed to return the tape drive mode switching mechanism from the position corresponding to the normal constant-speed feed mode (N-PLAY) to the position corresponding to the normal fast-feed mode (N-FF), as shown in FIG. 21. In this case, the capstan motor 14 is also de-energized for a period of time that is slightly longer than the period of time in which the control motor 55 is reversed, by about 2.0 μs before and after the reversal of the control motor 55, for the reason of slackening of the cassette tape T or the like.

Figure 22:
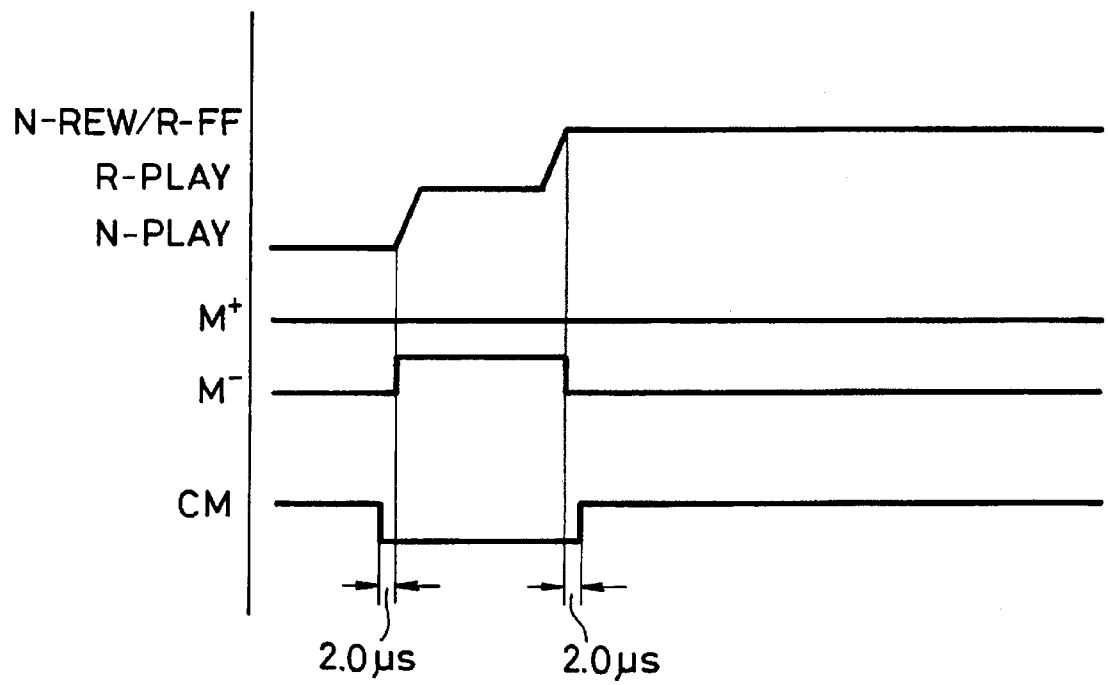
FIG. 22 is a timing chart illustrative of switching from the normal constant-speed feed mode to the normal rewind mode.

For switching from the normal constant-speed feed mode (N-PLAY) to the normal rewind mode (N-REW), the control motor 55 is reversed to return the tape drive mode switching mechanism to the position corresponding to the normal rewind mode (N-REW), as shown in FIG. 22. The capstan motor 14 is also de-energized in the same manner as described above.

Figure 23:
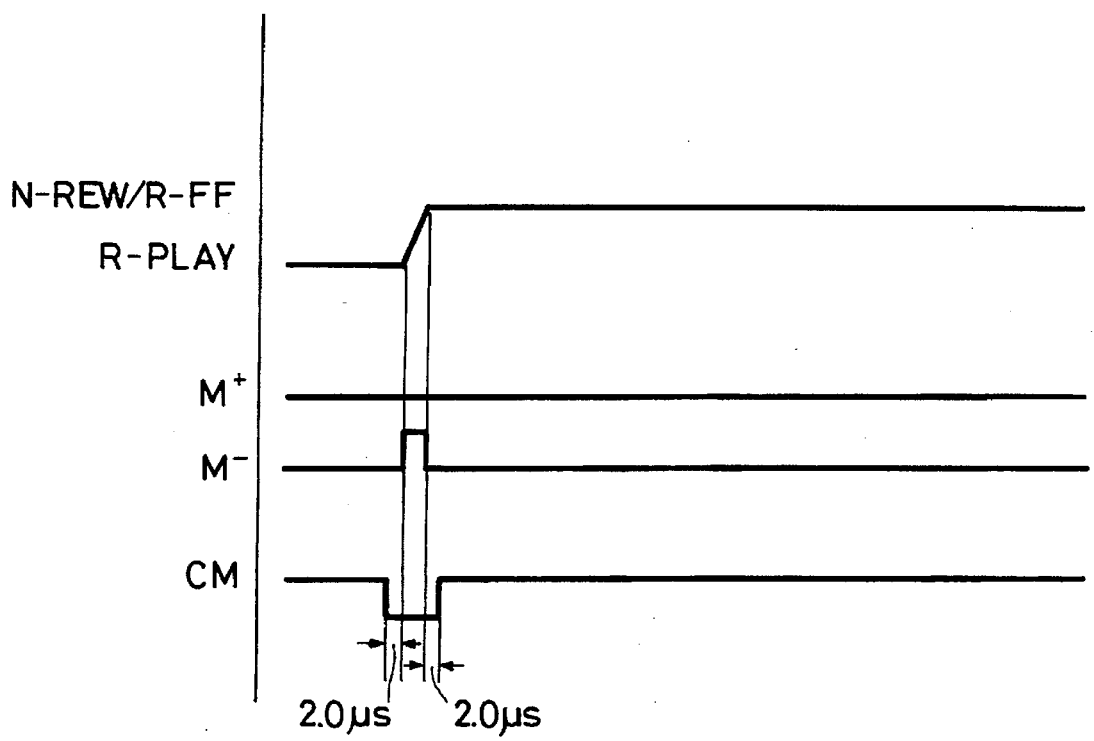
FIG. 23 is a timing chart illustrative of switching from the reverse constant-speed feed mode to the reverse fast-feed mode.
Figure 24:
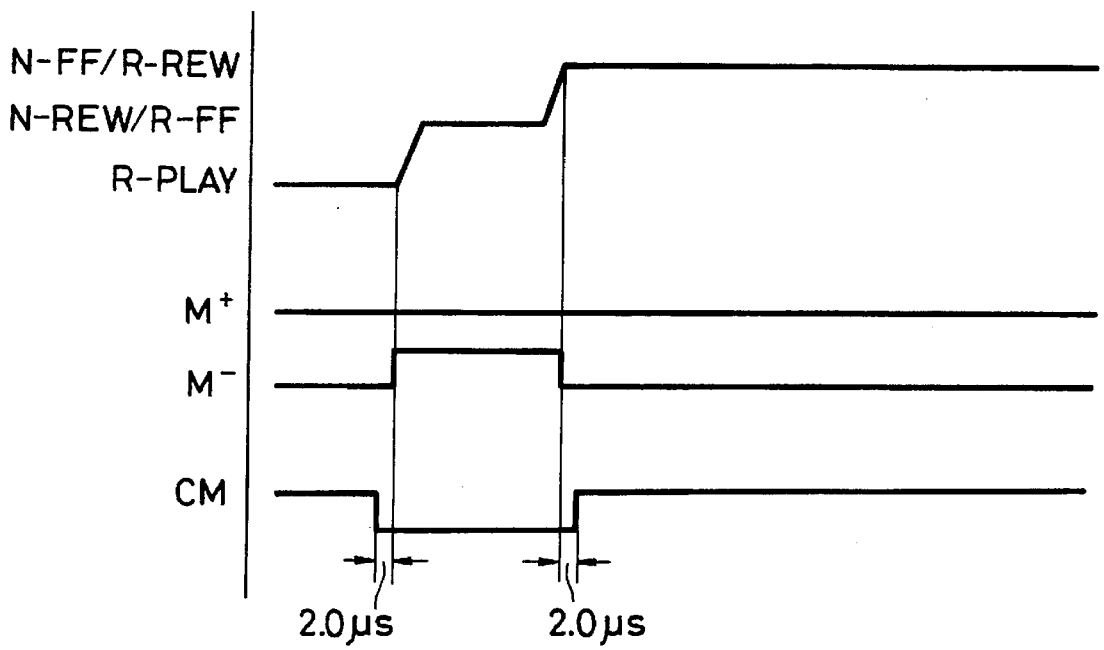
FIG. 24 is a timing chart illustrative of switching from the reverse constant-speed feed mode to the reverse rewind mode.

For switching from the reverse constant-speed feed mode (R-PLAY) to the reverse fast-feed mode (R-FF), the control motor 55 is reversed to move the tape drive mode switching mechanism to a position corresponding to the reverse fast-feed mode (R-FF), i.e., the position corresponding to the normal rewind mode (N-REW), as shown in FIG. 23. For switching from the reverse constant-speed feed mode (R-PLAY) to the reverse rewind mode (R-REW), the control motor 55 is reversed to move the tape drive mode switching mechanism to a position corresponding to the reverse rewind mode (R-REW), i.e., the position corresponding to the normal fast-mode mode (N-FF), as shown in FIG. 24. For both the above switching operations, the capstan motor 14 is de-energized for a period of time that is slightly longer than the period of time in which the control motor 55 is reversed, by about 2.0 μs before and after the reversal of the control motor 55, for the reason of slackening of the cassette tape T or the like.

Figure 25:
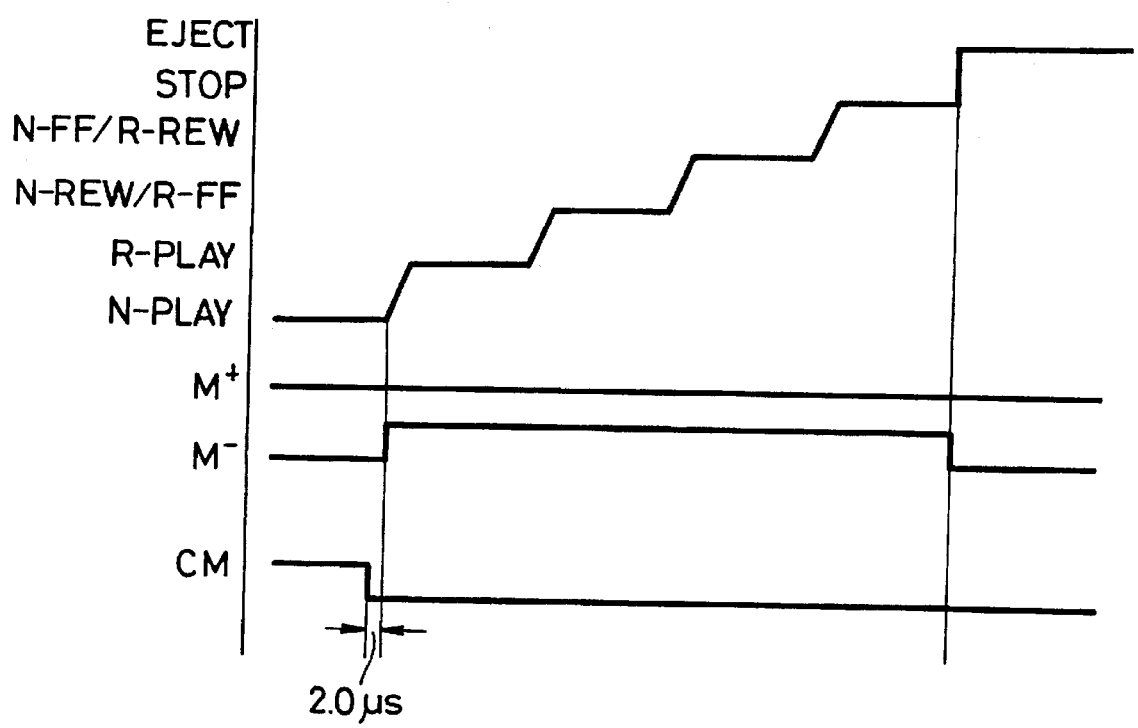
FIG. 25 is a timing chart illustrative of switching from the normal constant-speed feed mode to an eject mode.

The eject mode is carried out in response to operation of an eject key, or upon a tape operation failure, or when the microcomputer is reset. For ejecting the cassette tape T from the normal constant-speed feed mode (N-PLAY), the control motor 55 is reversed to move the tape drive mode switching mechanism from the position corresponding to the normal constant-feed mode (N-PLAY) to a position corresponding to the eject mode (EJECT), as shown in FIG. 25. In that case, the tape drive mode switching mechanism is stopped before the capstan motor 14 is reversed.

The control motor 55 is energized in the same manner as described above to return from the reverse constant speed feed mode (R-PLAY) to the eject mode (EJECT).

As described above, when the tape drive mode switching mechanism is returned to the position corresponding to the eject mode (EJECT), the control motor 55 is switched to the loading mechanism for unloading the cassette tape T from the cassette tape player.

While the gears are employed as members for transmitting rotational forces in the illustrated embodiment, idlers may be employed as such members. The various parts or components of the tape transport may be modified as to their configurations and layout depending on the overall arrangement of the tape transport.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A reversible tape player comprising:

a pair of capstans;

a pair of flywheels cooperating respectively with said pair of capstans;

a pair of reel bases;

a single capstan motor rotatable only in one direction for driving said pair of capstans;

belt means for transmitting rotation from said single capstan motor to rotate said pair of flywheels in respective directions different from each other;

a stationary low-speed-feed rotation transmitting gear rotatable by one of said flywheels for transmitting rotation therefrom through a slip mechanism;

switchable rotational gear means for selectively transmitting rotation from said stationary low-speed-feed rotation transmitting gear to one of said reel bases to feed a tape at a low speed; and a switching mechanism for displacing said switchable rotational gear means away from said stationary low-speed-feed rotation transmitting gear into operative coupling with the other of said flywheels to allow said switchable rotational gear means to selectively transmit rotation from the other of said flywheels to one of said reel bases to feed the tape at a high speed relative to said low speed, wherein said switchable rotational gear means comprises a pair of gears arranged so that one of said gears is rotatable selectively by either said stationary low-speed-feed rotation transmitting gear or the other of said flywheels depending on an operation of said switching mechanism, and the other of said pair of gears transmits rotation to either one or the other of said reel bases.

2. A reversible tape player according to claim 1, further comprising a gear lever, said pair of gears being rotatably supported on said gear lever in rolling contact with each other, said gear lever being angularly movable about an axis of rotation of one of said pair of gears and about an axis of rotation of the other of said pair of gears.

3. An operation switching mechanism comprising:

a control motor;

a support member;

a drive gear supported on said support member and reversibly rotatable by said control motor;

a rotatable swing lever rotatably supported on said support member in rolling contact with said drive gear for reciprocal angular movement about said drive gear in response to rotation of said drive gear;

first and second intermediate rotatable gears disposed on either side of said rotatable swing lever in spaced-apart relation from each other;

a first grooved gear reciprocally movable by said first intermediate rotatable gear in response to rotation of said rotatable swing lever upon rolling contact of said rotatable swing lever with said first intermediate rotatable Sear due to angular movement of said rotatable swing lever in one direction;

a second grooved gear reciprocally movable by said second intermediate rotatable gear in response to rotation of said rotatable swing lever upon rolling contact of said rotatable swing lever with said second intermediate rotatable gear due to angular movement of said rotatable swing lever in an opposite direction;

a tape cassette loading mechanism reciprocally movable in response to respective reciprocal movement of said first grooved gear; and a tape transport mechanism reciprocally movable in response to respective reciprocal movement of said second grooved gear;

a pair of engaging pins mounted on said support member on either side of said rotatable swing lever; and said first and second grooved gears having respective concentric grooves defined therein, said engaging pins engaging in said concentric grooves, respectively, and respective relief regions extending radially outwardly from one end of said concentric grooves, respectively, wherein when said rotatable swing lever is angularly moved in said one direction or said opposite direction, one or the other of said engaging pins move from the relief region into the groove in said first or second grooved gear, thereby allowing said first or second grooved gear to rotate in response to rotation of said rotatable swing lever.

4. An operation switching mechanism comprising:

a control motor;

a support member;

a drive gear supported on said support member and reversibly rotatable said control motor;

a rotatable swing lever rotatably supported on said support member in rolling contact with said drive gear for reciprocal angular movement about said drive gear in response to rotation of the drive gear;

first and second intermediate rotatable gears disposed on either side of said rotatable swing lever in spaced-apart relation from each other;

a first grooved gear reciprocally movable by said first intermediate rotatable gear in response to rotation of said rotatable swing lever upon rolling contact of said rotatable swing lever with said first intermediate rotatable sear due to angular movement of said rotatable swing lever in one direction;

a second grooved gear reciprocally movable by said second intermediate rotatable gear in response to rotation of said rotatable swing lever upon rolling contact of said rotatable swing lever with said second intermediate rotatable gear due to angular movement of said rotatable swing lever in an opposite direction;

a tape cassette loading mechanism reciprocally movable in response to respective reciprocal movement of said first grooved gear; and a tape transport mechanism reciprocally movable in response to respective reciprocal movement of said second grooved gear;

an intermediate rotation transmitting gear disposed between said second intermediate rotatable gear and said second grooved gear; and a plurality of switch means which can be turned on and off depending on the angle of rotation of said intermediate rotation transmitting gear for controlling energization and deenergization of said control motor to stop said second grooved gear in a plurality of positions between positions to which said second grooved gear reciprocally moves.

* * * * *

UNITED STATES PATENT AND TRADEMARK OFFICE
CERTIFICATE OF CORRECTION

PATENT NO. : 5,668,681
DATED : September 16, 1997
INVENTOR(S) : Koji Umezawa

It is certified that error appears in the above-identified patent and that said Letters Patent is hereby corrected as shown below:

Col.4, line 67, change "$21c_2$," first occurrence, to --$21c_1$--
Col.11, line 2, change "constantspeed" to --constant-speed--
Col.13, line 53, change "where-upon" to --whereupon--
Col.14, line 57, after "constant" insert -- - --

<u>In the claims</u>:
Col.15, line 64, change "Sear" to --gear--
Col.16, line 41, change "sear" to --gear--

Signed and Sealed this

Fifteenth Day of September, 1998

Attest:

BRUCE LEHMAN

Attesting Officer        Commissioner of Patents and Trademarks